US012617985B2

(12) United States Patent
Shimizu et al.

(10) Patent No.: US 12,617,985 B2
(45) Date of Patent: May 5, 2026

(54) PRESSURE-SENSITIVE ADHESIVE SHEET AND USE THEREOF

(71) Applicant: NITTO DENKO CORPORATION, Ibaraki (JP)

(72) Inventors: Yosuke Shimizu, Ibaraki (JP); Naofumi Kosaka, Ibaraki (JP); Ryoko Asai, Ibaraki (JP); Kenta Kumakura, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 861 days.

(21) Appl. No.: 17/802,756

(22) PCT Filed: Feb. 24, 2021

(86) PCT No.: PCT/JP2021/006816
§ 371 (c)(1),
(2) Date: Aug. 26, 2022

(87) PCT Pub. No.: WO2021/172342
PCT Pub. Date: Sep. 2, 2021

(65) Prior Publication Data

US 2023/0144464 A1 May 11, 2023

(30) Foreign Application Priority Data

Feb. 28, 2020 (JP) ................................ 2020-034310

(51) Int. Cl.
*C09J 133/08* (2006.01)
*C08F 2/48* (2006.01)
(Continued)

(52) U.S. Cl.
CPC ............... *C09J 133/08* (2013.01); *C08F 2/48* (2013.01); *C08F 220/1804* (2020.02);
(Continued)

(58) Field of Classification Search
CPC .... C08F 226/10; C09J 4/00; C09J 7/10; C09J 7/385; C09J 11/06; C09J 133/00;
(Continued)

(56) References Cited

U.S. PATENT DOCUMENTS

2005/0136251 A1 6/2005 Kishimoto et al.
2011/0268929 A1* 11/2011 Tran ...................... B32B 27/283 428/189
(Continued)

FOREIGN PATENT DOCUMENTS

CN 102325850 A 1/2012
CN 111670234 A 9/2020
(Continued)

OTHER PUBLICATIONS

International Search Report issued for corresponding International Patent Application No. PCT/JP2021/006816 on May 18, 2021, along with an English translation (5 pages).
(Continued)

*Primary Examiner* — Scott R. Walshon
(74) *Attorney, Agent, or Firm* — Hauptman Ham, LLP

(57) ABSTRACT

Provided is a PSA sheet that can combine bonding reliability and peeling removability, and further can be peeled off without causing deformation or damage to the adherend in various peeling modes. The PSA sheet provided by this invention has a PSA layer. The PSA sheet has a water-peel strength of 2 N/10 mm or less. The PSA sheet further has a stress at 100% elongation of less than 30 MPa as well as a multiplication product ($\sigma f \cdot \varepsilon f$) of fracture stress $\sigma f$(MPa) and fracture strain $\varepsilon f$ (%) of 250 or greater.

7 Claims, 1 Drawing Sheet

(51) Int. Cl.
*C08F 220/18* (2006.01)
*C08F 220/20* (2006.01)
*C08F 226/10* (2006.01)
*C09J 11/06* (2006.01)

(52) U.S. Cl.
CPC ...... *C08F 220/1806* (2020.02); *C08F 220/20* (2013.01); *C08F 226/10* (2013.01); *C09J 11/06* (2013.01); *C09J 2301/124* (2020.08); *C09J 2301/302* (2020.08); *C09J 2301/416* (2020.08); *C09J 2301/502* (2020.08); *C09J 2433/001* (2013.01)

(58) Field of Classification Search
CPC ...... C09J 133/04; C09J 133/08; C09J 201/00; C09J 2203/37; C09J 2301/124; C09J 2301/302; C09J 2301/416; C09J 2301/308; C09J 2301/502; C09J 2433/00; C09J 2433/001
See application file for complete search history.

(56) References Cited

U.S. PATENT DOCUMENTS

| | | | | |
|---|---|---|---|---|
| 2021/0179893 | A1* | 6/2021 | Ogino | C09J 9/00 |
| 2021/0214587 | A1 | 7/2021 | Kosaka et al. | |
| 2021/0230455 | A1 | 7/2021 | Kosaka et al. | |
| 2021/0348036 | A1 | 11/2021 | Okamoto et al. | |

FOREIGN PATENT DOCUMENTS

| | | | | |
|---|---|---|---|---|
| CN | 112513216 | A | 3/2021 | |
| JP | 2005-148638 | A | 6/2005 | |
| JP | 2009-73920 | A | 4/2009 | |
| JP | 2012-514104 | A | 6/2012 | |
| JP | 2016-8288 | A | 1/2016 | |
| JP | 2017-125105 | A | 7/2017 | |
| JP | 2017-186470 | A | 10/2017 | |
| JP | 2020-2232 | A | 1/2020 | |
| JP | 2020-23656 | A | 2/2020 | |
| JP | 2020-23679 | A | 2/2020 | |
| TW | 201546229 | A | 12/2015 | |
| TW | 201912689 | A | 4/2019 | |
| TW | 202007740 | A | 2/2020 | |
| WO | 2010/077541 | A1 | 7/2010 | |
| WO | WO-2017187800 | A1 * | 11/2017 | B33Y 30/00 |
| WO | 2019/151192 | A1 | 8/2019 | |
| WO | 2019/225649 | A1 | 11/2019 | |

OTHER PUBLICATIONS

Written Opinion issued for corresponding International Patent Application No. PCT/JP2021/006816 on May 18, 2021 (5 pages).

Office Action dated Apr. 3, 2025 for corresponding Japanese Patent Application No. 2021-027357, along with an English translation (8 pages).

Office Action issued on May 8, 2024, for corresponding Chinese Patent Application No. 202180017400.1, along with an English machine translation (24 pages).

Office Action issued on Sep. 21, 2023 for corresponding Chinese Patent Application No. 202180017400.1, along with an English machine translation (22 pages).

Search Report of Notice of Allowance date mailed Aug. 24, 2024 for corresponding Chinese Patent Application No. 202180017400.1, along with an English translation (5 pages).

"Coating Technology & Abstracts", No. 2, Feb. 28, 2010, pp. 32-55, concise explanation of the relevance is available (24 pages).

Yamauchi et al., "Thermoreversible Poly(alkyl acrylates) Consisting of Self-Complementary Multiple Hydrogen Bonding", Macromolecules, vol. 36, No. 4, Jan. 30, 2023, pp. 1083-1088 (6 pages).

Office Action issued on Aug. 26, 2024 for corresponding Taiwanese Patent Application No. 110106995, along with an English translation (13 pages).

Notification of Transmittal of Translation of the International Preliminary Report on Patentability (PCT/IB/338) issued on Sep. 9, 2022 for corresponding International Patent Application No. PCT/JP2021/006816 (7 pages).

* cited by examiner

PRESSURE-SENSITIVE ADHESIVE SHEET AND USE THEREOF

CROSS REFERENCE TO RELATED APPLICATIONS

This application is a National Stage of International Application No. PCT/JP2021/006816, filed on Feb. 24, 2021, which designates the United States and was published in Japan, and which claims priority to Japanese Patent Application No. 2020-034310, filed on Feb. 28, 2020 in the Japan Patent Office. All of the aforementioned applications are hereby incorporated by reference in their entireties.

TECHNICAL FIELD

The present invention relates to a pressure-sensitive adhesive sheet, a method for peeling a pressure-sensitive adhesive sheet, and a method for separating two adherends joined with a pressure-sensitive adhesive sheet. The present application claims priority to Japanese Patent Application No. 2020-34310 filed on Feb. 28, 2020; and the entire content thereof is incorporated herein by reference.

BACKGROUND ART

In general, pressure-sensitive adhesive (PSA) exists as a soft solid (a viscoelastic material) in a room temperature range and has a property to adhere easily to an adherend with some pressure applied. For such a property, PSA has been widely used in various fields as an on-support PSA sheet having a PSA layer on a support or as a support-less PSA sheet free of a support. Technical documents about PSA sheets include Patent Documents 1 and 2. Patent Document 2 relates to a substrate-supported PSA sheet that can be removed by pulling.

CITATION LIST

Patent Literature

[Patent Document 1] Japanese Patent Application Publication No. 2020-23656

[Patent Document 2] Japanese Patent Application Publication No. 2016-8288

SUMMARY OF INVENTION

Technical Problem

Various properties are required of PSA depending on the purposes. Among these properties, some are difficult to simultaneously achieve at a high level such that in improving a certain property, some other property has a tendency to decrease. One example of a set of properties in a trade-off relationship is adhesive strength to adherend and removability. For instance, after an adherend is fixed using a PSA sheet, for removal of the PSA sheet from the adherend, in order to prevent damage and deformation to the adherend, it may be necessary that, in contrast to when fixed, the PSA sheet's peel strength (adhesive strength) on the adherend) be lowered. For instance, when the adherend is fragile or thin, it is not easy to obtain a PSA sheet having both good removability and high adhesive strength.

PSA sheets with good removability can be preferably used in various applications for their excellent reworkability, recyclability and repairability. The term rework here refers to, for instance, removal of PSA sheets from adherends when their applications to adherends result in failures (shifting, wrinkling, bubble formation, trapping of foreign material, etc.) and removal (or disassembly) of PSA sheets from adherends when defects are found after their applications, typically referring to reapplication of PSA sheets using the removed original PSA sheets or new PSA sheets. The term recycle refers to making adherends removed from PSA sheets available for reuse and encompasses reuse here. As for products that use PSA sheets to fix parts and the like, when they are in hands of users and reach the end of the product life cycle, in view of effective resource utilization, environmental impact reduction, etc., it would be significant if the respective parts can be disassembled for reuse without damage to the parts or leftover PSA sheets. The term repair refers to replacement, repair and examination of failed parts when there are problems such as parts failure. It would be beneficial if parts fixed with PSA sheets can be separated and subjected to replacement, repair and examination, for it leads to user-cost reduction and environmental impact reduction.

With respect to such issues, in Patent Document 1, the present inventors have suggested a novel PSA sheet (water-peelable PSA sheet) that allows easy peeling with an aqueous liquid such as water and has highly reliable water resistance during bonding. This invention relates to an improvement in the water-peelable PSA sheet with an objective to provide a PSA sheet that can combine bonding reliability with removability and further that can be removed in various removal modes (e.g., after joining a low-strength rigid adherend such as a glass plate, removal from the adherend) without causing deformation or damage to the adherend. Other objectives of this invention are to provide novel methods for removal and adherend separation, using PSA sheets.

Solution to Problem

This description provides a PSA sheet having a PSA layer. The PSA sheet according to a first aspect has a water-peel adhesive strength of 2 N/10 mm or less, determined after the adhesive face of the PSA layer is applied to the surface of an alkaline float glass plate adherend having a contact angle of 5° to 10° with distilled water, the resultant is stored at room temperature for one day, 20 μL of distilled water is dropped onto the adherend and the distilled water is allowed to enter an interfacial edge between the adhesive face and the adherend: according to JIS Z0237: 2009 "10.4.1 Method 1:180° Peel Strength to Test Plate": specifically, at a test temperature of 23° C. at a tensile speed of 300 mm/min at a peel angle of 180° using a tensile tester. The PSA sheet has a stress at 100% elongation of less than 30 MPa and has a multiplication product ($\sigma f \cdot \varepsilon f$) of fracture stress $\sigma f$(MPa) and fracture strain $\varepsilon f$ (%) of 250 or greater. Here, the stress at 100% elongation, fracture stress $\sigma f$ and fracture strain $\varepsilon f$ are determined based on a tensile test carried out at a tensile speed of 100 mm/min.

In a second aspect of the PSA layer-containing PSA sheet provided by this description, the PSA layer comprises at least one species of compound selected among surfactants and polyoxyalkylene backbone-containing compounds. The PSA sheet has a stress at 100% elongation of less than 30 MPa as well as a multiplication product ($\sigma f \cdot \varepsilon f$) of fracture stress $\sigma f$(MPa) and fracture strain $\varepsilon f$ (%) of 250 or greater. Here, the stress at 100% elongation, fracture stress $\sigma f$ and fracture strain $\varepsilon f$ are determined based on a tensile test carried out at a tensile speed of 100 mm/min.

According to the PSA sheet having such a structure, because the water-peel strength is limited to 2 N/10 mm or less (first aspect) or because the PSA layer comprises at least one species of compound (or "water-peeling agent" hereinafter) selected among surfactants and polyoxyalkylene backbone-containing compounds (second aspect), while having good water-peeling properties utilizing aqueous liquid such as water, bonding reliability can be combined with removability. As the PSA sheet has a stress at 100% elongation of less than 30 MPa, it shows relatively weak resistance against a pull in an in-plane direction of the PSA sheet (in a direction perpendicular to the thickness direction of the PSA sheet) at the beginning of the pull and can be stretched by a smaller force. Thus, when the PSA sheet applied to an adherend is pulled, in the initial stage thereof, stretching of the PSA sheet creates a gap near the bonding interface with the adherend and the gap can be used for entry of aqueous liquid into the peel front line with the adherend, bringing about good water-peeling properties. Here, the term "peel front line" refers to where the PSA sheet starts to separate from the adherend when peeling of the PSA sheet from the adherend is allowed to proceed. The PSA sheet has a multiplication product ($\sigma f \cdot \varepsilon f$) of fracture stress $\sigma f$(MPa) and fracture strain $\varepsilon f$ (%) of 250 or greater, and thus stretchability and strength are balanced. With the PSA sheet having at least a certain relative level of strength against stretching of the PSA sheet, good peeling removal can be achieved without rupture (tearing) against the pull during peeling.

While interpretations are subject to no limitations, the PSA sheet in the embodiment have the following advantages. First, the PSA sheet can have improved removability. In particular, the PSA sheet combines stretchability and water-peeling properties, thereby allowing its removal without causing forceful deformation or damage to the adherend. For instance, in an embodiment joining two adherends, when the two adherends are formed of rigid materials or when at least one of them is formed of a fragile material (e.g., a hard brittle material), by stretching and water-peeling the PSA sheet having the aforementioned structure, the PSA sheet can be removed without causing forceful deformation or damage to the adherend. In particular, when the two adherends are formed of rigid materials, there are some cases where, during the removal, the rigidity of the adherends does not allow peeling at a peel angle larger than 0° (e.g., at) 90°, impeding entry of aqueous liquid into the peel front line to initiate water-peeling. According to the PSA sheet disclosed herein, by pulling the PSA sheet in the pull-out direction to form a gap and supplying aqueous liquid to the gap, water-peeling (pull-out water-peeling) is possible without causing deformation or damage to the adherend. In other words, removability from rigid bodies (e.g., reworkability on rigid body) is obtained. For instance, even when the adherend is a low-strength rigid adherend such as a thin glass plate, for bonding/fixing, it has bonding reliability based on the sufficient adhesive strength; and for removal, it can be removed without damage to the adherend.

Second, the PSA sheet can be peeled off in the pull-out direction; and therefore, even in a removal mode limited in peel angle, it can be removed from the adherend. For instance, when the adherend is a part or the like, depending on where the part is placed, it can be difficult to pull the PSA sheet fixing the part at a non-parallel angle (e.g., in the 90° or 180° direction) relative to the adhesive face. Even in such a use, according to the PSA sheet disclosed herein, its removal is possible by pulling the PSA sheet at an angle below 90° relative to the adhesive face (e.g., in the parallel direction with the adhesive face).

Third, the occurrence of rupture and the like can be prevented while the tensile removal (stretch peeling) type of PSA sheet is being pulled. In a conventional tensile removal type of PSA sheet, it is necessary to use a material having sufficient strength capable of withstanding a pulling force which depends on the adhesive strength of the PSA sheet. However, because the PSA sheet disclosed herein has water-peeling properties, the aqueous liquid can be used to significantly reduce the strength of the adhesive bond to the adherend. Thus, during tensile removal of the PSA sheet, it can be prevented from tearing due to the strength of the adhesive bond to the adherend or at least the risk thereof can be greatly reduced. This can be a particularly advantageous feature because, for instance, in being removed from a large-surface adherend bonded with a high adhesive strength at large, the rupture-causing strength of the adhesive bond to the adherend can be greatly reduced.

The PSA sheet's insusceptibility (resistance) to rupturing during tensile removal can be a particularly important feature, for instance, in an embodiment involving tensile removal from two adherends. In particular, if a PSA sheet joining two adherends ruptures when pulled in an attempt to pull it out from between the two adherends, the PSA sheet, being elastic, retracts in between the two adherends, sometimes making it difficult to pull out the PSA sheet edge to grip for tensile removal. The PSA sheet disclosed herein has a reduced peel strength for tensile removal based on the water-peeling properties; and therefore, aforementioned problems are less likely to occur even without increasing the strength of the PSA sheet, more specifically, even when the PSA sheet has a relatively low strength corresponding to the stretchability. This can be a preferable feature in an application requiring at least a certain level of adhesive strength for joining.

Forth, as described above, for removal, the strength of the adhesive bond to the adherend can be significantly reduced, allowing the PSA sheet whose use involves tensile removal to have a reduced strength. For instance, the PSA sheet is allowed to have a smaller thickness. Not only that, for instance, it is expected to increase the flexibility in the material selection and design of the PSA sheet, and further, to broaden the application range of the tensile removal type of PSA sheet.

In some preferable embodiments, the PSA sheet has a normal peel strength of 2.5 N/10 mm or greater and 15 N/10 mm or less, determined after the adhesive face of the PSA layer is applied to the surface of an alkaline float glass plate adherend having a contact angle of 5° to 10° with distilled water, according to JIS Z0237: 2009 "10.4.1 Method 1:180° Peel Strength to Test Plate," specifically, at a test temperature of 23° C. at a tensile speed of 300 mm/min at a peel angle of 180° using a tensile tester. According to the PSA sheet satisfying this property (normal adhesive strength property), bonding reliability based on the adhesive strength to the adherend can be combined with removability based on the water-peeling properties.

In some preferable embodiments, the PSA layer may be formed from a PSA composition comprising an acrylic partial polymer, a crosslinking agent and a photopolymerization initiator. The PSA sheet formed from a PSA composition having such a composition can preferably bring about the effect of the art disclosed herein. For instance, in an embodiment of the PSA sheet essentially consisting of a PSA layer, the PSA having such a composition may preferably satisfy required properties.

In some preferable embodiments, the surfactant has an HLB (hydrophile-lipophile balance) of 10 or higher and 20 or lower. By using a surfactant having an HLB of 10 to 20 as a water-peeling agent, the water-peeling properties of the PSA sheet further improves.

The PSA layer may be formed from a water-dispersed PSA composition, a solvent-based PSA composition, an active energy ray-curable PSA composition or a hot-melt PSA composition. In embodiments using PSAs formed from these PSA compositions, the effect of the art disclosed herein can be obtained.

As the PSA layer, an acrylic PSA layer can be used. The use of the acrylic PSA is likely to bring about highly reliable adhesive strength. For instance, when a water-peeling agent is used with the acrylic PSA, the target water-peeling properties can be obtained while maintaining the adhesive properties of the acrylic PSA. The effect of the art disclosed can be preferably obtained in an embodiment having a PSA layer formed of an acrylic PSA.

The PSA sheet according to some preferable embodiments is formed as an adhesively double-faced PSA sheet (double-faced PSA sheet). In the double-faced PSA sheet, the PSA layer constitutes at least one adhesive face thereof. The effect of the art disclosed can be particularly preferably obtained in the form of a doubled-faced PSA sheet. For instance, when the adherends adhered to the respective faces of the double-faced PSA sheet are formed from rigid materials, without causing forceful deformation or damage to the adherends, their joints can be loosened. In other words, good peeling removability from rigid bodies (e.g., reworkability on rigid body) can be obtained.

The PSA sheet according to some embodiments may have first and second PSA layers, each as the PSA layer, and further have a middle layer placed between the first and second PSA layers. In such an embodiment, the effect of the art disclosed herein can be preferably obtained. In this embodiment, the PSA layer can be formed from, for instance, a water-dispersed PSA composition, solvent-based PSA composition, active energy ray-curable PSA composition or hot-melt PSA composition. For instance, it is preferable to use a PSA layer formed from a water-dispersed PSA composition.

In some embodiments, the middle layer can be formed of a material comprising an acrylic resin, a polyurethane-based resin, a urethane (meth)acrylate-based polymer, a polyolefinic resin, a polyvinyl chloride-based resin, a silicone, a rubber or an elastomer. According to an embodiment that has a middle layer using such a material, adhesive strength and water-peeling properties based on the PSA layer can be preferably combined with the target mechanical properties (stress at 100% elongation and product of fracture stress and fracture strain, in particular).

This Description provides a method for peeling a stretchable PSA sheet adhered on an adherend. This method comprises a step of pulling and peeling the PSA sheet in a <90° direction relative to the adhesive face (bonding interface) with the adherend (peeling step). The PSA sheet peeling step is carried out in the presence of aqueous liquid where subjected to peeling (separation) in the bonding interface between the adherend and the PSA sheet. According to this method, using the aqueous liquid, the PSA sheet can be peeled from the adherend. In other words, for bonding/fixing, the PSA sheet can achieve highly reliable adhesion: conversely, when peeled (for removal), it can be suitably peeled and removed from the adherend. More specifically, because the PSA sheet is stretchable, in the initial stage of pulling the PSA sheet in the peeling step, near the bonding interface with the adherend, stretching of the PSA sheet creates a gap and the gap can be used for entry of the aqueous liquid where the bonding interface is being peeled (separated); and based on the consequent water-peeling, good removal can be achieved. The PSA sheet peeled by applying the removal method disclosed herein typically includes a PSA layer. The PSA sheet can be, for instance, any PSA sheet disclosed herein.

This Description also provides a method for separating two adherends joined with a stretchable PSA sheet. This method comprises a step of pulling the PSA sheet in a direction to pull it out from between the two adherends, typically using the stretchability of the PSA sheet. The PSA sheet pulling step is carried out in the presence of aqueous liquid where subjected to peeling (separation) in at least one of the bonding interfaces between the PSA sheet and the two adherends. According to this method, the aqueous liquid can be used to water-peel and pull out the PSA sheet from between two adherends; and therefore, even when the two adherends are formed from a rigid material and/or a fragile material, the two adherends can be separated without causing forceful deformation or fracture to the adherends. In other words, for bonding/fixing, the PSA sheet can achieve highly reliable adhesion: conversely, when loosening the joint, it can be suitably separated and removed from the adherend. More specifically, because the PSA sheet is stretchable, in the initial stage of pulling the PSA sheet in the pulling step, near the bonding interface with the adherend, stretching of the PSA sheet creates a gap and the gap can be used for entry of the aqueous liquid where the bonding interface is being peeled (separated); and based on the consequent water-peeling, the two adherends joined with the PSA sheet can be separated. The PSA sheet used in the separation method disclosed herein typically includes a PSA layer. The PSA sheet can be, for instance, any PSA sheet disclosed herein (typically a double-faced PSA sheet).

In the peeling method and the separation method, where subjected to peeling (separation) in the bonding interface between the adherend and the PSA sheet is also called the "peel front line."

The scope of the invention for which the present patent application seeks patent protection includes a suitable combination of the respective features described above.

DESCRIPTION OF EMBODIMENTS

Figure 1:
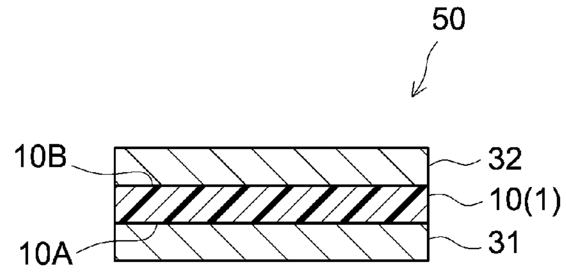
FIG. 1 shows a cross-sectional diagram schematically illustrating the PSA sheet according to an embodiment.

Preferable embodiments of the present invention are described below. Matters necessary to practice this invention other than those specifically referred to in this Description can be understood by a person skilled in the art based on the disclosure about implementing the invention in this Description and common technical knowledge at the time the application was filed. The present invention can be practiced based on the contents disclosed in this Description and common technical knowledge in the subject field. In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

Constitutional Examples of PSA Sheet

The PSA sheet disclosed herein may have, for instance, a cross-sectional structure schematically illustrated in FIG. 1. PSA sheet 1 is formed as a supportless double-faced PSA sheet formed of a PSA layer 10. As shown in FIG. 1, supportless double-faced PSA sheet 1 prior to use (before applied to adherend) may be in the form of a release-linered PSA sheet 50. In an embodiment, PSA sheet 1 may be in a form where the respective faces 10A and 10B of PSA layer 10 are protected with release liners 31 and 32 each having a releasable surface (release face) at least on the PSA layer side. Alternatively, it may be in an embodiment where it is wound or layered so that the backside (the surface on the reverse side of the PSA layer side) of release liner 31 as a release face makes contact with adhesive face 10B, whereby adhesive faces 10A and 10B are protected.

Figure 2:
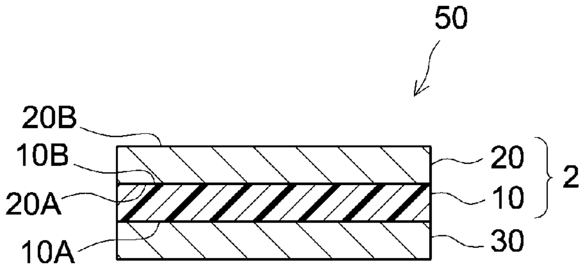
FIG. 2 shows a cross-sectional diagram schematically illustrating the PSA sheet according to another embodiment.

As shown in FIG. 2, the PSA sheet disclosed herein can also be formed as an adhesively single-faced PSA sheet 2 comprising a PSA layer 10 whose first surface 10A is a face (adhesive face) adhered to an adherend, and a support (support layer) 20 laminated on the second surface 10B of PSA layer 10. PSA layer 10 is permanently bonded to a first face 20A of support 20. In the example shown in FIG. 2, PSA layer 10 has a monolayer structure. PSA sheet 2 prior to use (before applied to adherend) may have, for instance as shown in FIG. 2, a form of release-linered PSA sheet 50 in which adhesive face 10A is protected with release liner 30 having a releasable surface (release face) at least on the PSA layer side. Alternatively, it may be in an embodiment where it is wound or layered so that the second face 20B (the reverse side of the first face 20A, or the backside) of support 20 as a release face makes contact with and protects adhesive face 10A.

Figure 3:
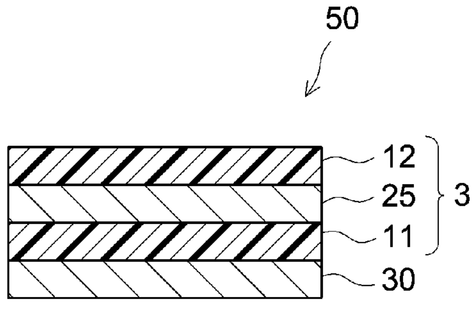
FIG. 3 shows a cross-sectional diagram schematically illustrating the PSA sheet according to another embodiment.

For instance, the PSA sheet disclosed herein can be formed as an adhesively double-faced PSA sheet (double-faced PSA sheet) 3 having a middle layer 25 as shown in FIG. 3. PSA sheet 3 shown in FIG. 3 has PSA layers 11 and 12 on the respective faces (both non-releasable) of middle layer 25, with one of them, namely PSA layer (first PSA layer) 11, protected with a release liner 30 whose both sides are release faces. PSA sheet 3 of this kind can be wound to allow the other PSA layer (second PSA layer) 12 to come into contact with the backside of release liner 30 to also protect PSA layer 12 with release liner 30. Alternatively, the PSA sheet may have the respective PSA layers protected individually with two release liners whose at least PSA layer sides are release faces.

As for the release liner, no particular limitations are imposed. For example, it is possible to use a release liner in which a surface of a liner substrate such as resin film or paper is release-treated, or a release liner formed from a low adhesive material such as fluorine-based polymer (polytetrafluoroethylene, etc.) and polyolefin-based resin (polyethylene, polypropylene, etc.). For the release treatment, for instance, a release agent such as silicone-based and long-chain alkyl-based release agents can be used. In some embodiments, release-treated resin film can be preferably used as the release liner.

The PSA layer in the PSA sheet disclosed herein is not limited to a monolayer structure such as the constitutional example shown in FIG. 1 or 2. It may further have one, two or more PSA layers (additional PSA layers) having the same or different compositions. For instance, in the middle-layer-containing PSA sheet shown in FIG. 3, the middle layer can be a PSA layer. In this case, the PSA sheet may have at least three PSA layers including the first and second PSA layers forming the surface of the PSA sheet as well as the PSA layer as the middle layer.

The PSA sheet disclosed herein may be peeled, using the stretchability, and thus may have a tab at an end. The tab can be held to pull the PSA sheet, thereby improving the efficiency of peeling. The tab shape is not particularly limited. A finger-pinchable shape (e.g., a rectangular shape) is preferable. Such a PSA sheet may have a shape having a length (direction) such as a ribbon-like shape. For instance, with a tab provided at one end of the length (direction) of the PSA sheet, the PSA sheet can be easily stretched, allowing peeling removal.

<Properties of PSA Sheet>

(Water-Peel Strength)

The PSA sheet according to some embodiments is characterized by having a water-peel strength of 2 N/10 mm or less (typically, 2.0 N/10 mm or less). The PSA sheet satisfying this property has good water-peeling properties and can be removed from the adherend using aqueous liquid such as water. According to the PSA sheet whose water-peel strength is limited up to the prescribed value as above, it is possible to reduce the load applied to the adherend when peeling the PSA sheet. This is particularly significant in the PSA sheet applied to, for instance, a thin adherend, a fragile adherend, an adherend susceptible to deformation (elongating, warping, twisting, etc.) and an adherend having a thin surface layer susceptible to damage. The water-peel strength can be about 1.5 N/10 mm or less, about 1.2 N/10 mm or less, or even 1.0 N/10 mm or less. In some preferable embodiments, the water-peel strength is preferably about 0.7 N/10 mm or less, more preferably about 0.5 N/10 mm or less, yet more preferably 0.3 N/10 mm or less, for instance, possibly about 0.2 N/10 mm or less. The minimum possible water-peel strength is 0.0 N/10 mm or greater (e.g., greater than 0.0 N/10 mm) and can be about 0.1 N/10 mm or greater. In particular, the water-peel strength is determined by the method described later in Examples. The water-peel strength can be adjusted by suitably selecting PSA species and PSA components (typically, water-peeling agent, etc.) based on the content herein. The PSA sheet disclosed herein encompasses an embodiment where the water-peel strength is not limited. In such an embodiment, the PSA sheet is not limited to species having this property.

From the standpoint of enhancing the removability (including reworkability, recyclability and repairability), in the measurement of water-peel strength, it is preferable that the PSA sheet peels from the adherend without leaving the PSA on the adherend. That is, the PSA sheet preferably has excellent anti-residue properties. The presence or absence of residual PSA left on the adherend can be determined, for instance, by visually observing the adherend after the PSA sheet is peeled.

(Normal Peel Strength)

As described above, during removal, the PSA sheet disclosed herein can be favorably removed based on the water-peeling properties. On the other hand, when being adhesively fixed to an adherend, it may have sufficient adhesive strength. While no particular limitations are imposed, the PSA sheet disclosed herein may have a normal peel strength greater than 2.0 N/10 mm. From the standpoint of obtaining high bonding reliability, the normal peel strength is preferably about 2.5 N/10 mm or greater, more preferably about 3.5 N/10 mm or greater, or yet more preferably about 4.5 N/10 mm or greater. The PSA sheet according to some embodiments may exhibit a normal peel strength of about 5.5 N/10 mm or greater (e.g., about 6.5 N/10 mm or greater). The maximum normal peel strength is not particularly limited. For instance, it can be 25 N/10 mm or less, 20 N/10 mm or less, 15 N/10 mm or less, or even 10 N/10 mm or less. In particular, the normal peel strength is determined by the method described later in Examples. The normal peel strength can be adjusted by suitably selecting PSA species and PSA components based on the content herein.

(Water-Peel Strength Reduction Rate)

The PSA sheet according to some preferable embodiments has a water-peel strength reduction rate of about 40% or higher (e.g., about 50% or higher), determined based on the ratio (N1/N0) of water-peel strength N1 to normal peel strength N0. The PSA sheet having a high water-peel strength reduction rate has sufficient adhesive strength when applied to an adherend: when peeled and removed, aqueous liquid such as water can be used for peeling to significantly reduce the load put on the adherend while being peeled. With this property, for instance, good peeling removability can be combined with abilities to prevent shifting and lifting of the PSA sheet applied to the adherend. In some embodiments, the water-peel strength reduction rate is suitably 60% or higher, preferably 65% or higher, for instance, possibly 70% or higher, 75% or higher, 80% or higher, or even 85% or higher. In some embodiments, the water-peel strength reduction rate is 90% or higher, for instance, possibly 95% or higher, or even 98% or higher (typically 99% or higher). The maximum water-peel strength reduction rate is theoretically 100% and is, for instance, below 100%.

The water-peel strength reduction rate is determined by the next equation:

$$\text{Water-peel strength reduction rate (\%)}=(1-(N1/N0))\times 100$$

(Stress at 100% Elongation)

The PSA sheet disclosed herein is characterized, for one, by having a stress at 100% elongation of less than 30 MPa. The PSA sheet satisfying this property has reduced resistance to a pull in an in-plane direction of the PSA sheet (a direction perpendicular to the thickness direction of the PSA sheet) at the beginning of the pull and can be stretched by a smaller force. Thus, when the PSA sheet applied to an adherend is pulled, in the initial stage thereof, stretching of the PSA sheet creates a gap near the bonding interface with the adherend and the gap can be used for entry of aqueous liquid into the peel front line with the adherend, likely bringing about good water-peeling properties. The stress at 100% elongation is suitably 15 MPa or less, for instance, possibly 10 MPa or less. In some embodiments, the PSA sheet has a stress at 100% elongation of preferably 7 MPa or less, more preferably 5 MPa or less, or yet more preferably 3 MPa or less. In some preferable embodiments, the PSA sheet has a stress at 100% elongation of 1.0 MPa or less, more preferably 0.7 MPa or less, yet more preferably 0.5 MPa or less, or particularly preferably 0.3 MPa or less. The stress at 100% elongation can also be 0.20 MPa or less. The minimum stress at 100% elongation is not particularly limited. From the standpoint of the efficiency of the PSA sheet application and prevention of tearing, etc., it is suitably 0.01 MPa or greater, for instance, possibly 0.05 MPa or greater, or even 0.10 MPa or greater.

(Stress at 500% Elongation)

While no particular limitations are imposed, the PSA sheet disclosed herein may have a stress at 500% elongation of 50 MPa or less (e.g., 30 MPa or less). The PSA sheet satisfying this property tends to have excellent pulling removability. The stress at 500% elongation is suitably 15 MPa or less, for instance, possibly 10 MPa or less. In some embodiments, the PSA sheet has a stress at 500% elongation of preferably 7 MPa or less, more preferably 5 MPa or less, or yet more preferably 3 MPa or less. In some preferable embodiments, the PSA sheet has a stress at 500% elongation of 1.0 MPa or less, more preferably 0.7 MPa or less, or yet more preferably 0.5 MPa or less. The stress at 500% elongation can also be 0.30 MPa or less. The minimum stress at 500% elongation is not particularly limited. From the standpoint of the efficiency of PSA sheet application and prevention of tearing, etc., it is suitably 0.05 MPa or greater, for instance, possibly 0.10 MPa or greater, or even 0.50 MPa or greater.

(Stretch Strength Property)

The PSA sheet disclosed herein is characterized by having a multiplication product ($\sigma f \cdot \varepsilon f$) of fracture stress $\sigma f$(MPa) and fracture strain $\varepsilon f$ (%) of 250 or greater, determined based on a tensile test carried out at a tensile speed of 100 mm/min. The PSA sheet satisfying this property has balanced stretchability and strength, and has at least a certain relative level of strength against stretching of the PSA sheet during peeling; and therefore, good peeling removal can be achieved without rupture (tearing) against the pull during peeling. The $\sigma f \cdot \varepsilon f$ value (stretch strength property) is preferably 300 or greater, more preferably 400 or greater, yet more preferably 500 or greater, for instance, possibly 800 or greater, or even 1200 or greater. Such a PSA sheet tends to have superior stretchability and strength, and be less susceptible to damage such as tearing during removal of the PSA sheet, showing excellent pulling removability. It tends to also have excellent processability. The maximum $\sigma f \cdot \varepsilon f$ value is not particularly limited. From the standpoint of tearing resistance, handling properties, workability, etc., it is possibly less than 100000, suitably 50000 or less, also possibly 30000 or less, 15000 or less, 7000 or less, or even 4000 or less (e.g., 2000 or less). The PSA sheet disclosed herein can be peeled with a low load. Thus, without excessively enhancing the stretch strength properties, that is, even if the $\sigma f \cdot \varepsilon f$ value is lower in the range of 250 or greater, good peeling removal can be achieved.

In some embodiments, the of $\varepsilon f$ value (stretch strength property) is possibly less than 10000, or suitably 7000 or less. From the standpoint of simultaneously obtaining adhesive properties (adhesive strength, etc.) and so on, it is preferably 3000 or less, more preferably 2000 or less, yet more preferably 1000 or less, particularly preferably 700 or less, also possibly 500 or less, or even 400 or less. These $\sigma f \cdot \varepsilon f$ values can be preferably used in a supportless PSA sheet.

In other embodiments, the $\sigma f \cdot \varepsilon f$ value (stretch strength property) is preferably 300 or greater, more preferably 1000 or greater, yet more preferably 3000 or greater, possibly 5000 or greater, or even 10000 or greater (e.g., 20000 or greater, further 30000 or greater). Such a PSA sheet may exhibit superior stretchability and strength. These $\sigma f \cdot \varepsilon f$ values can be preferably used in a PSA sheet having a support layer and/or a middle layer.

(Fracture Stress of)

The fracture stress $\sigma f$ of the PSA sheet disclosed herein is not particularly limited as long as it satisfies the $\sigma f \cdot \varepsilon f$ value. In some embodiments, from the standpoint of preventing tearing by pulling, the PSA sheet has a fracture stress $\sigma f$ of possibly 0.10 MPa or greater, suitably 0.20 MPa or greater (e.g., 0.30 MPa or greater), also possibly 0.50 MPa or greater, 0.80 MPa or greater, 1.00 MPa or greater, or even 1.20 MPa or greater (e.g., 1.50 MPa or greater). The PSA sheet having such a fracture stress of tends to have excellent processability. In other embodiments, the fracture stress σf is possibly 0.7 MPa or greater, suitably 1.0 MPa or greater, preferably 1.5 MPa or greater, also possibly 2.0 MPa or greater, 3.0 MPa or greater, 10 MPa or greater, or even 20 MPa or greater (e.g., 25 MPa or greater). The maximum fracture stress σf of the PSA sheet is possibly 200 MPa or less, suitably 150 MPa or less, also possibly 100 MPa or less, or even 30 MPa or less. In some embodiments, the PSA sheet's fracture stress of can be 50 MPa or less. From the standpoint of obtaining suitable stretchability, it is suitably 15 MPa or less, possibly 8 MPa or less, or even 6 MPa or less (e.g., 5 MPa or less). In other embodiments, from the standpoint of, for instance, simultaneously obtaining adhesive properties (adhesive strength, etc.) and so on, the fracture stress σf can also be 3.00 MPa or less, 2.00 MPa or less, 1.20 MPa or less, 1.00 MPa or less, 0.80 MPa or less, or even 0.60 MPa or less. According to the art disclosed herein, during peeling removal, the water-peeling properties can be utilized to peel the PSA sheet with a low load; and therefore, without excessively increasing the fracture stress of, that is, in an embodiment having a relatively low fracture stress of, the occurrence of defects due to insufficient strength such as tearing can be prevented.

(Fracture Strain εf)

The fracture strain εf(elongation at break) of the PSA sheet disclosed herein is not particularly limited as long as it satisfies the σf·εf value. In some embodiments, from the standpoint of obtaining stretchability suited for the water-peeling properties, the PSA sheet has a fracture strain εf of possibly 150% or higher, suitably 250% or higher (e.g., 280% or higher), preferably 300% or higher, more preferably 400% or higher, yet more preferably 500% or higher, also possibly 600% or higher, 800% or higher, or even 1000% or higher (e.g., 1500% or higher). The maximum fracture strain εf is not particularly limited. From the standpoint of obtaining good tearing resistance, handling properties, workability and so on while having suitable strength, it can be, for instance, 2000% or lower, 1200% or lower, 1000% or lower, 900% or lower, or even 800% or lower (e.g., 700% or lower).

The PSA sheet's mechanical properties (stress at 100% elongation, stress at 500% elongation, fracture stress σf and fracture strain εf) are determined based on a tensile test carried out at a tensile speed of 100 mm/min. More specifically, they are determined by the methods described later in Examples. The mechanical properties can be set and adjusted by suitably selecting, based on this Description, the PSA materials, the PSA components (e.g., the base polymer's molecular design, crosslinking agent, etc.), the support and middle layer's material species and formation methods, etc.

(Haze Value)

In the art disclosed herein, the haze value of the PSA sheet is not particularly limited. In some embodiments, the PSA sheet has a haze value of suitably about 10% or lower, or possibly about 5% or lower (e.g., about 3% or lower). The haze value is preferably 1.0% or lower. Such a highly transparent PSA sheet is suitable for optical applications requiring high optical transparency. The PSA sheet's haze value can be below 1.0%, below 0.7%, or even 0.5% or lower (e.g., 0 to 0.5%). These haze values with regard to the PSA sheet can also be preferably applied to the haze value of the PSA layer in the art disclosed herein.

Here, the "haze value" refers to the ratio of diffused light transmittance to total light transmittance when the analytical sample is irradiated with visible light. It is also called the cloudiness value. The haze value can be expressed by the equation below.

$$Th(\%)=Td/Tt\times100$$

In the equation, Th is the haze value (%), Td is the diffused light transmittance, and Tt is the total light transmittance. The haze value can be determined using a haze meter (e.g., product name MR-100 available from Murakami Color Research Laboratory Co., Ltd.) after the adhesive face of the PSA sheet is applied to one face of alkaline glass with 0.1% haze to form a laminate of the PSA sheet and the alkaline glass. For the measurement, the alkaline glass bearing the PSA sheet is arranged so that the PSA sheet is on the light source side. As the haze value of the alkaline glass is 0.1%, 0.1% is subtracted from the measurement value to determine the haze value (%) of the PSA layer.

<PSA Layer>

The PSA sheet disclosed herein has a PSA layer. The PSA layer may be formed comprising one, two or more species of PSA selected among various kinds of known PSA such as acrylic PSA, rubber-based PSA (based on natural rubber, synthetic rubber, a mixture of these, etc.), silicone-based PSA, polyester-based PSA, urethane-based PSA, polyether-based PSA, polyamide-based PSA, and fluorine-based PSA. Here, the acrylic PSA refers to a PSA whose primary component (base polymer) is an acrylic polymer. The same applies to the rubber-based PSA and other PSA.

The "base polymer" of a PSA refers to the main component among rubber-like polymers in the PSA. Besides this, the interpretation is subject to no other limitations. The rubber-like polymer refers to a polymer that shows rubber elasticity in a temperature range near room temperature. As used herein, the "main component" refers to the highest-content (most abundant) component by weight among the components included. Accordingly, for instance, when a PSA layer consists of three or more components, the amount of the main component in the PSA layer can be 34% by weight or greater.

As used herein, the term "acrylic polymer" refers to a polymer derived from a starting monomer mixture including more than 50% acrylic monomer by weight, or an acrylic polymer. The acrylic monomer refers to a monomer having at least one (meth)acryloyl group per molecule. As used herein, the term "(meth)acryloyl" comprehensively refers to acryloyl and methacryloyl. Similarly, the term "(meth)acrylate" comprehensively refers to acrylate and methacrylate, and the term "(meth)acryl" comprehensively refers to acryl and methacryl.

(Acrylic PSA)

In some embodiments, as the material forming the PSA layer, acrylic PSA can be preferably used. In particular, the PSA layer disclosed herein can be an acrylic PSA layer comprising an acrylic polymer. Acrylic PSA tends to have excellent transparency, weatherability and design freedom. Highly transparent acrylic PSA is preferably used in optical applications.

As for the PSA layer disclosed herein, for instance, a preferable acrylic PSA comprises, as the base polymer, an acrylic polymer formed from monomers including at least 33% (by weight) alkyl (meth)acrylate having a linear or branched alkyl group with 1 up to 20 carbon atoms at the ester terminus. Hereinafter, an alkyl (meth)acrylate having, at the ester terminus, an alkyl group with X up to Y number of carbon atoms may be referred to as an "$C_{X-Y}$ alkyl (meth)acrylate." For easy balancing of properties, the ratio of $C_{1-20}$ alkyl (meth)acrylate in the entire monomers (all monomers) of the acrylic polymer according to some embodiments is, for instance, 35% by weight or higher, suitably 40% by weight or higher, or possibly 45% by weight or higher. In other embodiments, the ratio of $C_{1-20}$ alkyl (meth)acrylate in all monomers of the acrylic polymer is suitably above 50% by weight, for instance, possibly 70% by weight or higher, 80% by weight or higher, or even 90% by weight or higher. The ratio of $C_{1-20}$ alkyl (meth)acrylate among the monomers can be, for instance, 99.9% by weight or lower, 99% by weight or lower, or even 95% by weight or lower. From the standpoint of the PSA layer's cohesion, etc., the ratio of $C_{1-20}$ alkyl (meth)acrylate in all monomers of the acrylic polymer according to some embodiments can be, for instance, 85% by weight or lower, 75% by weight or lower, 65% by weight or lower, 55% by weight or lower, or even 50% by weight or lower. A PSA limited in percentage of $C_{1-20}$ alkyl (meth)acrylate as above may have favorable tensile strength properties in a supportless PSA sheet formed of the PSA layer. For the $C_{1-20}$ alkyl (meth)acrylate, solely one species or a combination of two or more species can be used.

Non-limiting specific examples of the $C_{1-20}$ alkyl (meth) acrylate include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, stearyl (meth)acrylate, isostearyl (meth)acrylate, nonadecyl (meth)acrylate, and eicosyl (meth)acrylate.

Among these, it is preferable to use at least a $C_{4-20}$ alkyl (meth)acrylate and it is more preferable to use at least a $C_{4-18}$ alkyl (meth)acrylate. For example, as the monomer(s), one or each of n-butyl acrylate (BA) and 2-ethylhexyl acrylate (2EHA) is preferably included. An acrylic PSA including at least BA is particularly preferable. Other examples of $C_{4-20}$ alkyl (meth)acrylates that are preferably used include isononyl acrylate, n-butyl methacrylate (BMA), 2-ethylhexyl methacrylate (2EHMA), and isostearyl acrylate (iSTA). For the $C_{4-18}$ alkyl (meth)acrylate, solely one species or a combination of two or more species can be used.

In some embodiments, in the monomers forming the acrylic polymer, the ratio of $C_{4-18}$ alkyl (meth)acrylate in $C_{1-20}$ alkyl (meth)acrylate can be 70% by weight or higher. The ratio of $C_{4-18}$ alkyl (meth)acrylate can be, for instance, 80% by weight or higher, 90% by weight or higher, or even 95% to 100% by weight.

In addition to the alkyl (meth)acrylate, the monomers forming the acrylic polymer may include, as necessary, another monomer (copolymerizable monomer) that is able to copolymerize with the alkyl (meth)acrylate. As the copolymerizable monomer, it is possible to suitably use a monomer having a polar group (e.g., a carboxy group, a hydroxy group, a nitrogen atom-containing ring, etc.) or a monomer having a relatively high (e.g., 10° C. or higher) homopolymer glass transition temperature. The monomer having a polar group may be useful for introducing a cross-linking point into the acrylic polymer or increasing cohesive strength of the PSA. For the copolymerizable monomer, solely one species or a combination of two or more species can be used.

Non-limiting specific examples of the copolymerizable monomer include those indicated below.

Carboxy group-containing monomers: for example, acrylic acid, methacrylic acid, carboxyethyl acrylate, carboxypentyl acrylate, itaconic acid, maleic acid, fumaric acid, crotonic acid and isocrotonic acid:

Acid anhydride group-containing monomers: for example, maleic anhydride and itaconic anhydride:

Hydroxy group-containing monomers: for example, hydroxyalkyl (meth)acrylates such as 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth) acrylate, 8-hydroxyoctyl (meth)acrylate, 10-hydroxydecyl (meth)acrylate, 12-hydroxyauryl (meth)acrylate and (4-hydroxymethylcyclohexyl)methyl (meth)acrylate:

Monomers having a sulphonate group or a phosphate group: for example, styrene sulphonic acid, allyl sulphonic acid, sodium vinylsulphonate, 2-(meth)acrylamide-2-methylpropane sulphonic acid, (meth)acrylamide propane sulphonic acid, sulphopropyl (meth)acrylate, (meth)acryloyloxy naphthalenesulphonic acid and 2-hydroxyethylacryloyl phosphate:

Epoxy group-containing monomers: for example, epoxy group-containing acrylates such as glycidyl (meth)acrylate and (meth)acrylate-2-ethyl glycidyl ether, allyl glycidyl ether and (meth)acrylate glycidyl ether;

Cyano group-containing monomers: for example, acrylonitrile and methacrylonitrile;

Isocyanato group-containing monomers: for example, 2-isocyanatoethyl (meth)acrylate:

Amido group-containing monomers: for example, (meth) acrylamide: N,N-dialkyl (meth)acrylamides such as N,N-dimethyl (meth)acrylamide, N,N-diethyl (meth)acrylamide, N,N-dipropyl (meth)acrylamide, N,N-diisopropyl (meth) acrylamide, N,N-di(n-butyl)(meth)acrylamide and N,N-di(t-butyl)(meth)acrylamide: N-alkyl (meth)acrylamides such as N-ethyl (meth)acrylamide, N-isopropyl (meth)acrylamide, N-butyl (meth)acrylamide and N-n-butyl (meth)acrylamide; N-vinylcarboxylic acid amides such as N-vinylacetamide: a monomer having a hydroxy group and an amide group, for example, an N-hydroxyalkyl (meth)acrylamide such as N-(2-hydroxyethyl)(meth)acrylamide, N-(2-hydroxypropyl) (meth)acrylamide, N-(1-hydroxypropyl)(meth)acrylamide, N-(3-hydroxypropyl)(meth)acrylamide, N-(2-hydroxybutyl) (meth)acrylamide, N-(3-hydroxybutyl)(meth)acrylamide, and N-(4-hydroxy butyl)(meth)acrylamide; a monomer having an alkoxy group and an amide group, for example, an N-alkoxyalkyl (meth)acrylamide such as N-methoxymethyl (meth)acrylamide, N-methoxyethyl (meth)acrylamide, and N-butoxymethyl (meth)acrylamide; and N,N-dimethylaminopropyl (meth)acrylamide, N-(meth)acryloylmorpholine, etc.

Amino group-containing monomers: for example, aminoethyl (meth)acrylate, N,N-dimethylaminoethyl (meth)acrylate and t-butylaminoethyl (meth)acrylate.

Epoxy group-containing monomers: for example, glycidyl (meth)acrylate, methylglycidyl (meth)acrylate, and allyl glycidyl ether.

Monomers having a nitrogen atom-containing ring: for example, N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinylmorpholine, N-vinyl-3-morpholinone, N-vinyl-2-caprolactam, N-vinyl-1,3-oxazin-2-one, N-vinyl-3,5-morpholinedione, N-vinylpyrazole, N-vinylisoxazole, N-vinylthiazole, N-vinylisothiazole and N-vinylpyridazine (such as lactams including N-vinyl-2-caprolactam):

Monomers having a succinimide backbone: for example, N-(meth)acryloyloxy methylene succinimide, N-(meth) acryloyl-6-oxy hexamethylene succinimide and N-(meth) acryloyl-8-oxy hexamethylene succinimide:

Maleimides: for example, N-cyclohexylmaleimide, N-isopropylmaleimide, N-laurylmaleimide and N-phenylmaleimide:

Itaconimides: for example, N-methyl itaconimide, N-ethyl itaconimide, N-butyl itaconimide, N-octyl itaconimide, N-2-ethylhexyl itaconimide, N-cyclohexyl itaconimide and N-lauryl itaconimide: Aminoalkyl (meth)acrylates: for example, aminoethyl (meth)acrylate, N,N-dimethylaminoethyl (meth)acrylate, N,N-diethylaminoethyl (meth)acrylate and t-butylaminoethyl (meth)acrylate:

Alkoxy group-containing monomers: for example, alkoxyalkyl (meth)acrylates such as 2-methoxyethyl (meth) acrylate, 3-methoxypropyl (meth)acrylate, 2-ethoxyethyl (meth)acrylate, propoxyethyl (meth)acrylate, butoxyethyl (meth)acrylate and ethoxypropyl (meth)acrylate: alkoxy alkylene glycol (meth)acrylates such as methoxy ethylene glycol (meth)acrylate, methoxy poly(ethylene glycol)(meth) acrylate and methoxy poly(propylene glycol)(meth)acrylate:

Alkoxysilyl group-containing monomers, for example, alkoxysilyl group-containing (meth)acrylates such as (3-(meth)acryloxypropyl) trimethoxysilane, (3-(meth)acryloxypropyl)triethoxysilane, (3-(meth)acryloxypropyl)methyldimethoxysilane, and (3-(meth)acryloxypropyl) methyldiethoxysilane as well as alkoxysilyl group-containing vinyl compounds such as vinyltrimethoxysilane and vinyltriethoxysilane;

Vinyl esters: for example, vinyl acetate and vinyl propionate:

Vinyl ethers: for example, vinyl alkyl ethers such as methyl vinyl ether and ethyl vinyl ether;

Aromatic vinyl compounds: for example, styrene, α-methylstyrene and vinyl toluene;

Olefins: for example, ethylene, butadiene, isoprene and isobutylene:

(Meth)acrylic esters having an alicyclic hydrocarbon group: for example, alicyclic hydrocarbon group-containing (meth)acrylates such as cyclopentyl (meth)acrylate, cyclohexyl (meth)acrylate, isobornyl (meth)acrylate, dicyclopentanyl (meth)acrylate, and adamantyl (meth)acrylate:

(Meth)acrylic esters having an aromatic hydrocarbon group: for example, aromatic hydrocarbon group-containing (meth)acrylates such as phenyl (meth)acrylate, phenoxyethyl (meth)acrylate and benzyl (meth)acrylate:

Heterocyclic ring-containing (meth)acrylates such as tetrahydrofurfuryl (meth)acrylate, halogen atom-containing (meth)acrylates such as vinyl chloride and fluorine atom-containing (meth)acrylates, silicon atom-containing (meth) acrylates such as silicone (meth)acrylate, (meth)acrylic esters obtained from terpene compound derivative alcohols and the like.

When using such a copolymerizable monomer, its amount used is not particularly limited. For instance, it is suitably at least 0.01% by weight of the entire monomers. From the standpoint of obtaining greater effect of the use of the copolymerizable monomer, the amount of copolymerizable monomer used can be 0.1% by weight or more of the entire monomers, or even 0.5% by weight or more. For easy balancing of adhesive properties, the amount of copolymerizable monomer used is suitably 60% by weight or less of the entire monomers, possibly 50% by weight or less, or even 40% by weight or less.

In some embodiments, the monomers forming the acrylic polymer may include a hydroxy group-containing monomer. With the use of hydroxy group-containing monomer, the PSA's cohesive strength and crosslinking degree (e.g., crosslinking by an isocyanate crosslinking agent) can be favorably adjusted. As the hydroxy group-containing monomer, the examples listed earlier and the like can be used. For instance, 2-hydroxyethyl acrylate (HEA) and 4-hydroxybutyl acrylate (4HBA) can be preferably used. For the hydroxy group-containing monomer, solely one species or a combination of two or more species can be used.

When using a hydroxy group-containing monomer, its amount used is not particularly limited. Of the entire monomers, it can be, for instance, 0.01% by weight or greater, 0.1% by weight or greater, 0.5% by weight or greater, 1% by weight or greater, 5% by weight or greater, or even 10% by weight or greater. In some embodiments, of the entire monomers, the amount of hydroxy group-containing monomer used is 15% by weight or greater, suitably 20% by weight or greater, preferably 25% by weight or greater, more preferably 30% by weight or greater, yet more preferably 35% by weight or greater, or particularly preferably 40% by weight or greater. The use of hydroxy group-containing monomer in these ranges can preferably bring about a PSA layer having greater stretchability and strength in a well-balanced manner. From the standpoint of reducing water absorption of the PSA layer, in some embodiments, the amount of hydroxy group-containing monomer used is, for instance, suitably 50% by weight or less (e.g., 45% by weight or less) of the entire monomers; it can be 30% by weight or less, 25% by weight or less, 20% by weight or less, 10% by weight or less, or even 5% by weight or less.

In some embodiments, the monomers forming the acrylic polymer may include a monomer having a nitrogen atom (N). This can increase the PSA's cohesive strength. As the nitrogen atom-containing monomer, the examples listed earlier and the like can be used. A favorable example of the nitrogen atom-containing monomer is a monomer having a N-containing ring. As the monomer having a N-containing ring, the examples listed earlier and the like can be used, including, for instance, a cyclic N-vinyl amide represented by a general formula (1):

[Chem 1]

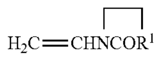

(1)

Here, in the general formula (1), $R^1$ is a divalent organic group, specifically $-(CH_2)_n-$; n is an integer between 2 and 7 (preferably 2, 3 or 4). In particular, N-vinyl-2-pyrrolidone can be preferably used. Other favorable examples of the nitrogen atom-containing monomer include (meth)acrylamides. For the N-containing monomer, solely one species or a combination of two or more species can be used.

When using a N-containing monomer (preferably a monomer having a N-containing ring), its amount used is not particularly limited. Of the entire monomers, it can be, for instance, 1% by weight or more, 2% by weight or more, or suitably 3% by weight or more. In some embodiments, the amount of N-containing monomer used can be 10% by weight or more, 15% by weight or more, or even 18% by weight or more of all monomers. The use of N-containing monomer in these ranges can preferably bring about a PSA layer having greater stretchability and strength in a well-balanced manner. The amount of the N-containing monomer used is suitably, for instance, 40% by weight or less of all monomers, possibly 35% by weight or less, 30% by weight or less, or even 25% by weight or less. In other embodiments, the amount of N-containing monomer used can be, for instance, 20% by weight or less, 12% by weight or less, 8% by weight or less, or even 6% by weight or less of all monomers.

In some embodiments, the monomers forming the acrylic polymer may include an alicyclic hydrocarbon group-containing (meth)acrylate. This can increase the PSA's cohesive strength. As the alicyclic hydrocarbon group-containing (meth)acrylate, the aforementioned examples and the like can be used. For instance, cyclohexyl acrylate (CHA) and isobornyl acrylate can be preferably used. For the alicyclic hydrocarbon group-containing (meth)acrylate, solely one species or a combination of two or more species can be used.

When using an alicyclic hydrocarbon group-containing (meth)acrylate, its amount used is not particularly limited. For instance, of the entire monomers, it can be 1% by weight or greater, 3% by weight or greater, or even 5% by weight or greater. In some embodiments, the amount of alicyclic hydrocarbon group-containing (meth)acrylate used can be 8% by weight or more, or even 10% by weight or more of the entire monomers. The maximum amount of alicyclic hydrocarbon group-containing (meth)acrylate used is suitably about 40% by weight or less, for instance, possibly 30% by weight or less, or also 25% by weight or less (e.g., 15% by weight or less, or even 10% by weight or less).

In some embodiments, the ratio of carboxy group-containing monomer in the monomers of the acrylic polymer can be, for instance, below 10% by weight, below 3% by weight, or even below 1% by weight (e.g., below 0.1% by weight). Carboxy group-containing monomers may not substantially used as the monomers of the acrylic polymer. Here, that carboxy group-containing monomers are not substantially used means that carboxy group-containing monomers are not used at least intentionally. Acrylic polymer having such a composition is likely to have metal corrosion-inhibiting properties on a metal-containing adherend.

While no particular limitations are imposed, the monomers of the acrylic polymer may include or may be free of the exemplified alkoxyalkyl (meth)acrylates and alkoxypolyalkylene glycol (meth)acrylates. In some embodiments, of the monomers of the acrylic polymer, the alkoxyalkyl (meth)acrylate content is below 20% by weight and the alkoxypolyalkylene glycol (meth)acrylate content is below 20% by weight. A polymer having such a monomer composition is less susceptible to gelation and facilitates sheet formation. The alkoxyalkyl (meth)acrylate content in the monomers is preferably below 10% by weight, more preferably below 3% by weight, or yet more preferably below 1% by weight. For instance, the monomers are essentially free of alkoxyalkyl (meth)acrylates (0 to 0.3% content by weight). Similarly, the alkoxypolyalkylene(meth)acrylate content in the monomers is preferably below 10% by weight, more preferably below 3% by weight, or yet more preferably below 1% by weight. For instance, the monomers are essentially free of alkoxypolyalkylene(meth)acrylates (0 to 0.3% content by weight).

In some preferable embodiments, as a monomeric component, the acrylic polymer may include a monomer having an aromatic ring such as a benzene ring. When an aromatic ring-containing monomer is incorporated in the acrylic polymer by polymerization, aromatic rings are introduced into, for instance, side chains or the like of the acrylic polymer. With the pseudo crosslinking (physical crosslinking) among the aromatic rings, it is possible to preferably obtain a PSA layer combining well-balanced stretchability and strength. As the aromatic ring-containing monomer, the examples listed earlier and the like can be used. Favorable examples of the aromatic ring-containing monomer include a (meth)acrylic acid ester ((meth)acrylate) having an aromatic hydrocarbon group. As the aromatic hydrocarbon group-containing (meth)acrylate, the examples listed earlier and the like can be used. For instance, benzyl acrylate (BzA) can be preferably used. For the aromatic ring-containing monomer, solely one species or a combination of two or more species can be used.

When using an aromatic ring-containing monomer, its amount used is not particularly limited. For instance, of the entire monomers, the amount of the aromatic ring-containing monomer used is possibly 5% by weight or greater, suitably 10% by weight or greater, preferably 15% by weight or greater, or possibly even 18% by weight or greater. Of the entire monomers, the amount of the aromatic ring-containing monomer used is, for instance, suitably 40% by weight or less, possibly 35% by weight or less, 30% by weight or less, or even 25% by weight or less. In other embodiments, of the entire monomers, the amount of the aromatic ring-containing monomer used can be, for instance, 20% by weight or less, 10% by weight or less, 3% by weight or less, or even 1% by weight or less.

In some preferable embodiments, the acrylic polymer may comprise a macromonomer as a monomeric component. When a macromonomer is incorporated in the acrylic polymer by polymerization, a segment originating from the macromonomer is introduced into, for instance, a side chain or the like of the acrylic polymer. Based on the segment's cohesive effect, it is possible to preferably obtain a PSA layer combining well-balanced stretchability and strength.

The macromonomer is not particularly limited to specific species. A suitable monomer is used among species that can form, in the polymer, segments capable of acting as cohesive domains (pseudo crosslinking points) in the PSA, through ionic bonding: intermolecular forces such as hydrogen bonding, T-T interaction and hydrophilic/hydrophobic interaction; entropic interactions; etc. Such a macromonomer may have a terminal polymerizable reactive group such as vinyl or (meth)acryloyl group along with a segment that forms a side chain after polymerization. The segment may have, for instance, a structure having a sequence of several repeats obtained by polymerization of a monomer, etc. Within a range where the target cohesion can be obtained, the segment may have a substituent such as carboxy group, hydroxy group, amino group or alkoxy group; or it may be free of such a substituent. Similar to known polymers, the segment may terminally have a group derived from a photopolymerization initiator.

Favorable examples of the macromonomer include a poly [alkyl (meth)acrylate], a macromonomer having a segment formed of a poly [alkyl (meth)acrylate], and a macromonomer having a segment formed of a polymeric structure of an aromatic vinyl compound such as polystyrene (PSt). The alkyl group forming the poly [alkyl (meth)acrylate] segment can be linear or branched. The number of carbon atoms in the alkyl group is, for instance, 1 to 20, preferably 1 to 8, or more preferably 1 to 4 (specifically 1, 2, 3 or 4, typically 1 or 4). In other embodiments, the alkyl group forming the poly [alkyl (meth)acrylate] segment is a cycloalkyl group, for instance, possibly a cycloalkyl group having 3 to 20 (e.g., 3 to 12, preferably 3 to 8, typically 3 to 6) carbon atoms. The aryl group forming the poly [aryl (meth)acrylate] segment can have 6 to 18 carbon atoms, with examples including phenyl group, benzyl group and naphthyl group. Specific examples of the macromonomer include a poly [methyl methacrylate](PMMA) segment, a macromonomer having a poly [butyl acrylate](PBA) segment and a macromonomer having a polystyrene (PSt) segment. For the macromonomer, solely one species or a combination of two or more species can be used.

The macromonomer's molecular weight is not limited to a specific range. It is possible to use a macromonomer having a suitable molecular weight within a range that enables formation of a PSA layer having the target stretchability and strength. The macromonomer's molecular weight can be, for instance, 500 or higher, or is possibly 800 or higher. From the standpoint of favorably obtaining cohesion while combining stretchability and strength, the molecular weight is preferably 1500 or higher, more preferably 3000 or higher, or yet more preferably 4500 or higher (e.g., 5000 or higher). From the standpoint of the ease of polymerization, compatibility, etc., the macromonomer's molecular weight is, for instance, 100000 or lower, suitably 30000 or lower, preferably lower than 10000, or even 8000 or lower. As used herein, the macromonomer's molecular weight refers to the number-average molecular weight (Mn) obtained by gel permeation chromatography (GPC) based on polystyrene standards.

When using a macromonomer, its amount used is not particularly limited. Of the entire monomers, it can be, for instance, 0.1% by weight or greater, suitably 1% by weight or greater, preferably 3% by weight or greater, more preferably 5% by weight or greater, or possibly even 10% by weight or greater (e.g., 15% by weight or greater). Of the entire monomers, the amount of macromonomer used is, for instance, suitably 40% by weight or less, possibly 35% by weight or less, 30% by weight or less, or even 25% by weight or less. In some embodiments, the amount of macromonomer used can also be, for instance, 20% by weight or less (e.g., 12% by weight or less) of all monomers. For instance, when the macromonomer has an aromatic ring, from the standpoint of the compatibility, etc., the amount of macromonomer used is more suitably, for instance, 10% by weight or less, or even 5% by weight or less (e.g., 3% by weight or less) in some cases.

The composition of the monomers forming the acrylic polymer can be selected so that the glass transition temperature determined by the Fox equation based on the monomer composition is −75° C. or higher and −10° C. or lower. In some embodiments, from the standpoint of the adhesive strength, etc., the Tg is suitably 0° C. or lower, preferably −10° C. or lower, more preferably −20° C. or lower, or possibly −30° C. or lower. From the standpoint of the cohesion, etc., the Tg can be, for instance, −60° C. or higher, −50° C. or higher, 45° C. or higher, or even −40° C. or higher.

Here, the Fox equation is a relational expression between the Tg of a copolymer and glass transition temperatures Tgi of homopolymers of the respective monomers constituting the copolymer.

$$1/Tg=\Sigma(Wi/Tgi)$$

In the Fox equation, Tg represents the glass transition temperature (unit:K) of the copolymer, Wi the weight fraction (copolymerization ratio by weight) of a monomer i in the copolymer, and Tgi the glass transition temperature (unit:K) of homopolymer of the monomer i.

As the glass transition temperatures of homopolymers used for determining the Tg value, values found in publicly known documents are used. For example, with respect to the monomers listed below, as the glass transition temperatures of homopolymers of the monomers, the following values are used:

2-ethylhexyl acrylate-70° C.
n-butyl acrylate-55° C.
methyl methacrylate 105° C.
methyl acrylate 8° C.
cyclohexyl acrylate 15° C.
N-cinyl-2-pyrrolidone 54° C.
2-hydroxyethyl acrylate-15° C.
4-hydroxybutyl acrylate-40° C.
dicyclopentanyl methacrylate 175° C.
isobornyl acrylate 94° C.
acrylic acid 106° C.
methacrylic acid 228° C.
benzyl acrylate 6° C.

With respect to the glass transition temperatures of homopolymers of monomers other than those listed above, values given in "*Polymer Handbook*" (3rd edition, John Wiley & Sons, Inc., Year 1989) are used. When the literature provides two or more values, the highest value is used.

With respect to monomers for which no glass transition temperatures of the corresponding homopolymers are given in *Polymer Handbook*, either, values obtained by the following measurement method are used (see Japanese Patent Application Publication No. 2007-51271). In particular, to a reaction vessel equipped with a thermometer, a stirrer, a nitrogen inlet and a condenser, are added 100 parts by weight of monomer, 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature, and a homopolymer solution having 33% by weight solids content is obtained. Then, this homopolymer solution is applied onto a release liner by flow coating and allowed to dry to prepare a test sample (a sheet of homopolymer) of about 2 mm thickness. This test sample is cut out into a disc of 7.9 mm diameter and is placed between parallel plates; and while applying a shear strain at a frequency of 1 Hz using a rheometer (ARES, available from Rheometrics Scientific, Inc.), the viscoelasticity is measured in the shear mode over a temperature range of −70° C. to 150° C. at a heating rate of 5° C./min; and the temperature corresponding to the peak top of the tan δ curve is taken as the Tg of the homopolymer.

In the polymerization, a known or commonly used thermal polymerization initiator or photopolymerization initiator can be used in accordance with the polymerization method and polymerization conditions. These polymerization initiators can be used solely as one species or in a combination of two or more species.

The thermal polymerization initiator is not particularly limited. For example, azo-based polymerization initiator, peroxide-based polymerization initiator, a redox-based polymerization initiator by combination of a peroxide and a reducing agent, substituted ethane-based polymerization initiator and the like can be used. More specific examples include, but not limited to, azo-based initiators such as 2,2'-azobisisobutyronitrile (AIBN), 2,2'-azobis(2-methylpropionamidine)disulfate, 2,2'-azobis(2-amidinopropane) dihydrochloride, 2,2'-azobis [2-(5-methyl-2-imidazolin-2-yl) propane]dihydrochloride, 2,2'-azobis(N,N'-dimethyleneisobutylamidine), and 2,2'-azobis [N-(2-carboxyethyl)-2-methylpropionamidine]hydrate: persulfates such as potassium persulfate and ammonium persulfate: peroxide-based initiators such as benzoyl peroxide, t-butyl hydroperoxide, and hydrogen peroxide; substituted ethane-based initiators such as phenyl-substituted ethane: redox-based initiators such as combination of a persulfate salt and sodium hydrogen sulfite, and combination of a peroxide and sodium ascorbate. Thermal polymerization can be preferably carried out at a temperature of, for instance, about 20° C. to 100° C. (typically 40° C. to 80° C.).

The photopolymerization initiator is not particularly limited. It is possible to use, for instance, ketal-based photopolymerization initiators, acetophenone-based photopolymerization initiators, benzoin ether-based photopolymerization initiators, acylphosphine oxide-based photopolymerization initiators, α-ketol photopolymerization initiators, aromatic sulphonyl chloride-based photopolymerization initiators, photoactive oxime-based photopolymerization initiators, benzoin-based photopolymerization initiators, benzylic photopolymerization initiators, benzophenone-based photopolymerization initiators, and thioxanthone-based photopolymerization initiators.

Such thermal polymerization initiator or photopolymerization initiator can be used in a usual amount in accordance with the polymerization method, embodiment of polymerization, etc., and there are no particular limitations to the amount. For instance, relative to 100 parts by weight of monomers to be polymerized, about 0.001 part to 5 parts by weight (typically about 0.01 part to 2 parts by weight, e.g., about 0.01 part to 1 part by weight) of polymerization initiator can be used.

In the polymerization, various kinds of heretofore known chain transfer agent (which may also be thought as molecular weight-adjusting agent or polymerization degree-adjusting agent) can be used as necessary. As the chain transfer agent, mercaptans can be preferably used, such as n-dodecyl mercaptan, t-dodecyl mercaptan, thioglycolic acid and α-thioglycerol. Alternatively, a chain transfer agent free of sulfur atoms (a sulfur-free chain transfer agent) can be used as well. Specific examples of the sulfur-free chain transfer agent include anilines such as N,N-dimethylaniline and N,N-diethylaniline; terpenoids such as α-pinene and terpinolene: styrenes such as α-methylstyrene and α-methylstyrene dimer; compounds having benzylidenyl groups such as dibenzylidene acetone, cinnamyl alcohol and cinnamyl aldehyde:hydroquinones such as hydroquinone and naphthohydroquinone: quinones such as benzoquinone and naphthoquinone: olefins such as 2,3-dimethyl-2-butene and 1,5-cyclooctadiene: alcohols such as phenol, benzyl alcohol and allyl alcohol; and benzyl hydrogens such as diphenylbenzene and triphenylbenzene.

For the chain transfer agent, solely one species or a combination of two or more species can be used. When using a chain transfer agent, it can be used in an amount of, for instance, about 0.01 part to 1 part by weight to 100 parts by weight of the monomers. The art disclosed herein can also be preferably implemented in an embodiment that uses no chain transfer agent.

The molecular weight of the acrylic polymer obtained by suitably employing the aforementioned various polymerization methods is not particularly limited and can be selected in a range suited for required properties. The acrylic polymer suitably has a weight average molecular weight (Mw) of, for instance, about $10\times10^4$ or higher (e.g., $20\times10^4$ or higher). From the standpoint of combining well-balanced cohesive strength and adhesive strength, it is suitably above $30\times10^4$. The acrylic polymer according to some embodiments preferably has a Mw of $40\times10^4$ or higher (typically about $50\times10^4$ or higher, e.g., about $55\times10^4$ or higher). The maximum Mw of the acrylic polymer can be about $500\times10^4$ or lower (e.g., about $150\times10^4$ or lower). The Mw can also be about $75\times10^4$ or lower. The Mw here refers to the value based on standard polystyrene determined by gel permeation chromatography (GPC). As the GPC system, for instance, model name HLC-8320 GPC (column: TSKgel GMH-H(S) available from Tosoh Corporation) can be used. The Mw can be the Mw of the acrylic polymer either in the PSA composition or in the PSA layer.

The PSA layer disclosed herein can be formed using a PSA composition that includes monomers having an aforementioned composition in a polymer form, in a non-polymerized form (i.e. a form where polymerizable functional groups are unreacted), or as a mixture of these. The PSA composition may exist in various forms such as a water-dispersed PSA composition in which the PSA (adhesive component) is dispersed in water, a solvent-based PSA composition containing the PSA in an organic solvent, an active energy ray-curable PSA composition prepared to form PSA when cured by active energy rays such as UV rays and radioactive rays, a hot-melt PSA composition that is applied in a thermally melted state and forms PSA when cooled to near room temperature. The PSA composition according to some embodiments can be a solvent-based PSA composition or a solvent-free PSA composition. The solvent-free PSA composition encompasses an active energy ray-curable PSA composition and a hot-melt PSA composition.

The PSA composition according to some embodiments can be an active energy ray-curable PSA composition. The use of an active energy ray-curable PSA composition can preferably bring about a PSA sheet capable of producing the effect of the art disclosed herein in an embodiment that is formed of a PSA layer and is supportless (possibly, middle-layer-free). The term "active energy ray" in this Description refers to an energy ray having energy capable of causing a chemical reaction such as polymerization, crosslinking, initiator decomposition, etc. Examples of the active energy ray herein include lights such as ultraviolet (UV) rays, visible lights, infrared lights, radioactive rays such as α rays, β rays, γ rays, electron beam, neutron radiation, and X rays. A favorable example of the active energy ray-curable PSA composition is a photocurable PSA composition. The photocurable PSA composition has an advantage of being able to easily form even a thick PSA layer. In particular, a UV ray-curable PSA composition is preferable.

The photocurable PSA composition typically comprises at least some of the monomers used to form the composition (possibly a certain species among the monomers or a fraction of its quantity) as a polymer. The polymerization method for forming the polymer is not particularly limited. Heretofore known various polymerization methods can be suitably used. For instance, thermal polymerization (typically carried out in the presence of a thermal polymerization initiator) such as solution polymerization, emulsion polymerization, bulk polymerization, etc.: photopolymerization carried out by irradiating light such as UV ray, etc. (typically in the presence of a photopolymerization initiator); radioactive ray polymerization carried out by irradiating radioactive rays such as β rays, γ rays, etc.; and the like. In particular, photopolymerization is preferable.

The photocurable PSA composition according to some preferable embodiments comprises a partial polymer (partial polymerization product, e.g., a partial acrylic polymer) of the monomers. Such a partial polymer is typically a mixture of a polymer derived from the monomers and unreacted monomers, and it preferably has a syrup form (viscous liquid). Hereinafter, a partial polymer having such a form may be referred to as "monomer syrup" or simply "syrup." The polymerization method for partial polymerization of the monomers is not particularly limited. Various polymerization methods such as those described earlier can be suitably selected and used. From the standpoint of the efficiency and convenience, a photopolymerization method can be preferably used. Photopolymerization allows easy control of the monomer conversion of the monomers through the polymerization conditions such as the radiation dose (amount) of light.

The monomer conversion of the monomer mixture in the partial polymer is not particularly limited. The monomer conversion can be, for instance, about 70% by weight or less, or preferably about 60% by weight or less. From the standpoint of the ease of preparing the PSA composition containing the partial polymer, the ease of coating, etc., the monomer conversion is suitably about 50% by weight or less, or preferably about 40% by weight or less (e.g., about 35% by weight or less). The minimum monomer conversion is not particularly limited. It is about 1% by weight or greater, or usually suitably about 5% by weight or greater.

The PSA composition containing a partial polymer of the monomers can be obtained by partially polymerizing a monomer mixture containing the entire amount of the monomers used for preparing the PSA composition by a suitable polymerization method (e.g., a photopolymerization method). The PSA composition containing a partial polymer of the monomers can be a mixture of a partially or fully polymerized product of a part of the monomers used for preparing the PSA composition, and remaining monomers or a partial polymer thereof. As used herein, the "fully polymerized product" indicates that the monomer conversion is above 95% by weight.

The partial polymer-containing PSA composition may include other components (e.g., photopolymerization initiator as well as water-peeling agent, crosslinking agent, polyfunctional monomer, acrylic oligomer, tackifier resin, silane coupling agent and the like described later) used as necessary. The method of adding such other components is not particularly limited. For instance, it can be included in the monomer mixture in advance or added to the partial polymer as well.

The PSA sheet according to some preferable embodiments has a PSA layer formed from a water-dispersed PSA composition. The use of a water-dispersed PSA composition can preferably bring about a PSA sheet capable of producing the effect of the art disclosed herein in an embodiment having a support layer (possibly a middle layer). Typical examples of the water-dispersed PSA composition include an emulsion-based PSA composition. The emulsion-based PSA composition typically comprises a polymerization product of monomers and an additive used as necessary. Emulsion polymerization of the monomers is usually carried out in the presence of an emulsifier. By emulsion polymerization, a polymerization reaction mixture is obtained as an emulsion in which the polymerization product (polymer) of the monomers is dispersed in water. The water-dispersed PSA composition used for forming the PSA layer can be preferably produced using the polymerization reaction mixture.

The emulsifier used in the emulsion polymerization is not particularly limited; known anionic emulsifiers, nonionic emulsifiers and the like can be used. These emulsifiers can be used singly as one species or in a combination of two or more species. Non-limiting examples of anionic emulsifiers include sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates. Non-limiting examples of non-ionic emulsifiers include polyoxyethylene alkyl ethers, polyoxyethylene alkyl phenyl ethers, polyoxyethylene aliphatic acid esters, and polyoxyethylene-polyoxypropylene block polymers. Reactive functional group-containing emulsifiers (reactive emulsifiers) can be used as well. Examples of reactive emulsifiers include a radically polymerizable emulsifier having a structure of an aforementioned anionic emulsifier or nonionic emulsifier with a radically polymerizable group such as propenyl group and ally ether group introduced therein.

In the emulsion polymerization, the emulsifier can be used in an amount of, for instance, 0.2 part by weight or greater, 0.5 part by weight or greater, or 1.0 part by weight or greater, or even 1.5 parts by weight or greater, relative to 100 parts by weight of the monomers. From the standpoint of increasing the water-resistant adhesive strength or increasing the PSA layer's transparency, in some embodiments, the amount of emulsifier used is usually suitably 10 parts by weight or less to 100 parts by weight of the monomers, preferably 5 parts by weight or less, or possibly even 3 parts by weight or less. It is noted that the emulsifier used here for emulsion polymerization can also serve as the water-peeling agent described later.

The PSA composition according to some embodiments can be a solvent-based PSA composition. The solvent-based PSA composition typically includes a solution polymerization product of the monomers and additives (e.g., peel strength enhancer) used as necessary. The solvent (polymerization solvent) used for the solution polymerization can be suitably selected among heretofore known organic solvents. For instance, it is possible to use one species of solvent or a mixture of two or more solvents, selected among aromatic compounds (typically aromatic hydrocarbons) such as toluene; esters such as ethyl acetate and butyl acetate; aliphatic or alicyclic hydrocarbons such as hexane and cyclohexane; halogenated alkanes such as 1,2-dichloroethane; lower alcohols such as isopropanol (e.g., monohydric alcohols having 1 to 4 carbon atoms); ethers such as tert-butyl methyl ether; and ketones such as methyl ethyl ketone. Solution polymerization gives the polymerization reaction mixture in a form where the polymerization product of the monomers is dissolved in a polymerization solvent. The solvent-based PSA composition disclosed herein can be preferably produced using the polymerization reaction mixture.

(Compound A)

In some preferable embodiments, the PSA layer may be characterized by comprising at least one species of compound A (or "water-peeling agent") selected among surfactants and compounds having polyoxyalkylene backbones. By this, the peel strength can be effectively reduced, using an aqueous liquid such as water. While reasons for this are not limited to particular interpretation, it is presumed that the surfactant or the compound having a polyoxyalkylene backbone has a hydrophilic region and, because of this, it is unevenly distributed on the PSA layer surface and effectively reduces the peel strength upon contact with water. As that the surfactant and the compound having a polyoxyalkylene backbone, one, two or more species can be used among known surfactants and compounds having polyoxyalkylene backbones without particular limitations. In typical, the compound A is preferably included in a free state in the PSA composition (and further in the PSA layer). As the compound A, from the standpoint of the ease of preparing the PSA composition, a species that exits as liquid at room temperature (about 25° C.) is preferably used. It is needless to say that among the surfactants, there are compounds having polyoxyalkylene backbones, and the reverse is true as well.

The HLB of the compound A (typically a surfactant) is not particularly limited. It is, for instance, 3 or higher, suitably about 6 or higher, or possibly 8 or higher (e.g., 9 or higher). In some preferable embodiments, the compound A has an HLB of 10 or higher. This tends to preferably bring about water-peeling properties. The HLB is more preferably 11 or higher, yet more preferably 12 or higher, or particularly preferably 13 or higher (e.g., 14 or higher, 15 or higher, or even 16 or higher). When a compound A having an HLB in these ranges is included in an acrylic polymer-containing PSA layer, water-peeling properties can be more effectively exhibited. The maximum HLB is 20 or lower, for instance, possibly 18 or lower, or even 16 or lower (e.g., 15 or lower).

HLB in this Description is hydrophile-lipophile balance by Griffin, and the value indicates the degree of affinity of a surfactant to water and oil, and the ratio between hydrophilicity and lipophilicity is represented by a numerical value between 0 and 20. HLB is defined in J. Soc. Cosmetic Chemists, 1, 311 (1949) by W. C. Griffin; "Surfactant Handbook" by Koshitami Takahashi, Yoshiro Namba, Motoo Koike and Masao Kobayashi, 3rd edition, Kogaku Tosho Publishing, Nov. 25, 1972, p179-182; and the like. A hydrophilicity enhancer having such HLB can be selected based on technical common knowledge of those skilled in the art, taking into account these reference documents as necessary.

As for the surfactant possibly used as the compound A, known nonionic surfactant, anionic surfactant, cationic surfactant and the like can be used. Among them, nonionic surfactant is preferable. As the surfactant, solely one species or a combination of two or more species can be used.

Examples of the nonionic surfactant include polyoxyethylene alkyl ethers such as polyoxyethylene lauryl ether, polyoxyethylene cetyl ether, polyoxyethylene stearyl ether and polyoxyethylene oleyl ether; polyoxyethylene alkyl phenyl ethers such as polyoxyethylene octyl phenyl ether and polyoxyethylene nonyl phenyl ether: sorbitan fatty acid esters such as sorbitan monolaurate, sorbitan monopalmitate, sorbitan monostearate and sorbitan monooleate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan triisostearate, polyoxyethylene sorbitan monooleate and polyoxyethylene sorbitan trioleate: polyoxyethylene glyceryl ether fatty acid esters; and polyoxyethylene-polyoxypropylene block polymers. Among these nonionic surfactants, solely one species or a combination of two or more species can be used.

Examples of the anionic surfactant include alkyl sulfates such as lauryl sulfate and octadecyl sulfate: fatty acid salts; alkyl benzene sulfonates such as nonyl benzene sulfonate and dodecyl benzene sulfonate; naphthalene sulfonates such as dodecylnaphthalene sulfonate; alkyl diphenyl ether disulfonate such as dodecyl diphenyl ether disulfonate: polyoxyethylene alkyl ether sulfates such as polyoxyethylene octadecyl ether sulfate and polyoxyethylene lauryl ether sulfate: polyoxyethylene alkyl phenyl ether sulfates such as polyoxyehtylene lauryl phenyl ether sulfate; polyoxyethylene styrenated phenyl ether sulfate; sulfosuccinates such as lauryl sulfosuccinate and polyoxyethylene lauryl sulfosuccinate; polyoxyethylene alkyl ether phosphates; and polyoxyethylene alkyl ether acetates. When the anionic surfactant is in a salt form, the salt can be, for instance, a metal salt (preferably a monovalent metal salt) such as sodium salt, potassium salt, calcium salt and magnesium salt; ammonium salt; or amine salt. Among these anionic surfactants, solely one species or a combination of two or more species can be used.

As the compound having a polyoxyalkylene backbone that can be used as the compound A, it is possible to use, for instance, polyalkylene glycols such as polyethylene glycol (PEG) and polypropylene glycol (PPG); polyethers containing polyoxyethylene units; polyethers containing polyoxypropylene units; compounds containing oxyethylene units and oxypropylene units (the sequence of these units may be random or blocked); and derivatives of these. Among the aforementioned surfactants, a compound having a polyoxyalkylene backbone can be used as well. These can be used solely as one species or in a combination of two or more species. Among them, it is preferable to use a compound containing a polyoxyethylene backbone (or a polyoxyethylene segment). PEG is more preferable.

The molecular weight (chemical formula weight) of the polyoxyalkylene backbone-containing compound (e.g., polyethylene glycol) is not particularly limited. For instance, it is suitably lower than 1000. In view of the ease of preparation of PSA composition, it is preferably about 600 or lower (e.g., 500 or lower). The minimum molecular weight of the polyoxyalkylene backbone-containing compound (e.g., polyethylene glycol) is not particularly limited. A preferably used species has a molecular weight of about 100 or higher (e.g., about 200 or higher, or even about 300 or higher).

In some embodiments, the amount of the compound A used is possibly about 3 parts by weight or less, or suitably about 2 parts by weight or less to 100 parts by weight of the total amount of the monomers forming the polymers in the PSA layer (e.g., the monomers of acrylic polymer, possibly synonymous with polymer or base polymer; the same applies hereinafter unless otherwise noted). From the standpoint of the optical properties such as transparency, it is preferably below 1 part by weight, more preferably below 0.7 part by weight, or yet more preferably below 0.5 part by weight. With a limited usage of the compound A, the adhesive strength tends to be easily maintained. A compound A having an HLB of 10 or higher tends to bring about good water-peeling properties even when added in a small amount. From the standpoint of obtaining the effect of the addition of compound A, the amount of the compound A relative to 100 parts by weight of the monomers of the polymer can be 0.001 part by weight or greater, for instance, it is suitably 0.01 part by weight or greater, or preferably 0.03 part by weight or greater (e.g., 0.1 part by weight or greater). In a composition where water-peeling properties are important, the amount of the compound A relative to 100 parts by weight of the monomers can be 0.2 part by weight or greater (e.g., 0.3 part by weight or greater).

(Polyfunctional Monomer)

In the PSA composition (and further in the PSA layer), a polyfunctional monomer may be used as necessary. The polyfunctional monomer may be helpful for purposes such as adjusting the cohesive strength. During the PSA layer formation or after application to an adherend, when allowed to react with the ethylenically unsaturated group by irradiation of light (e.g., UV light), etc., the polyfunctional monomer may form a crosslinking structure having suitable flexibility. Accordingly, "polyfunctional monomer" here can be called "crosslinking agent" as well. For instance, it is preferable to use a polyfunctional monomer in a PSA layer formed from a photo-curable PSA composition. As the polyfunctional monomer, a compound having two or more ethylenically unsaturated groups can be used. For the polyfunctional monomer, solely one species or a combination of two or more species can be used.

Examples of the ethylenically unsaturated group that the polyfunctional monomer has include, but are not limited to acryloyl group, methacryloyl group, vinyl group and allyl group. Preferable ethylenically unsaturated groups in view of the photoreactivity include acryloyl group and methacryloyl group. In particular, acryloyl group is preferable.

As the polyfunctional monomer, a compound having 2 to 10 ethylenically unsaturated groups per molecule is preferable, a compound having 2 to 8 ethylenically unsaturated groups per molecule is more preferable, and a compound having 2 to 6 ethylenically unsaturated groups per molecule is yet more preferable. In some embodiments, as the polyfunctional monomer, it is possible to use a compound having 4 or fewer (in particular, 2 to 4, e.g., 2 or 3, favorably 2)ethylenically unsaturated groups per molecule. When using a polyfunctional monomer having such a limited number of ethylenically unsaturated groups, the resulting PSA layer is likely to combine stretchability and strength.

Examples of the polyfunctional monomer include ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, pentaerythritol tri(meth) acrylate, dipentaerythritol hexa(meth)acrylate, ethyleneglycol di(meth)acrylate, 1,6-hexanediol di(meth)acrylate, 1,12-dodecanediol di(meth)acrylate, trimethylolpropane tri (meth)acrylate, tetramethylolmethane tri(meth)acrylate, allyl (meth)acrylate, vinyl (meth)acrylate, divinylbenzene, epoxy acrylate, polyester acrylate, urethane acrylate, butyldiol(meth)acrylate and hexyldiol di(meth)acrylate. Among them, trimethylolpropane tri(meth)acrylate, 1,6-hexanediol di(meth)acrylate and dipentaerythritol hexa(meth)acrylate are favorable, and 1,6-hexanediol diacrylate is more preferable.

The amount of polyfunctional monomer used depends on its molecular weight, the number of functional groups therein, etc. For instance, it is suitably in the range of about 0.01 part to 3.0 parts by weight to 100 parts by weight of the monomers forming the polymer (typically an acrylic polymer or the monomers thereof) in the PSA layer. In some embodiments, the amount of polyfunctional monomer used to 100 parts by weight of the monomers can be, for instance, 0.02 part by weight or greater, 0.1 part by weight or greater, 0.5 part by weight or greater, 1.0 part by weight or greater, or even 2.0 parts by weight or greater. With increasing amount of polyfunctional monomer used, a higher cohesive strength tends to be obtained. On the other hand, from the standpoint of avoiding a decrease in adhesiveness between the PSA layer and the adjacent layer caused by an excessive increase in cohesive strength, the amount of polyfunctional monomer used to 100 parts by weight of the monomers can be, for instance, 10 parts by weight or less, 5.0 parts by weight or less, or even 3.0 parts by weight or less. In some embodiments, the amount of polyfunctional monomer used to 100 parts by weight of the monomers is, for instance, suitably 1.0 part by weight or less, preferably 0.5 part by weight or less, more preferably 0.3 part by weight or less, or possibly even 0.2 part by weight or less. Such an amount of polyfunctional monomer is likely to bring about a PSA layer with improved stretchability or a PSA layer having stretchability and strength improved in a well-balanced manner. Such a PSA layer is favorable in an embodiment of the PSA sheet formed of a PSA layer.

(Crosslinking Agent)

The PSA composition disclosed herein can include a crosslinking agent as necessary, mainly for crosslinking within the PSA layer or between the PSA layer and the adjacent surface. The type of crosslinking agent is not particularly limited and can be selected among heretofore known crosslinking agents so that, for instance, the crosslinking agent provides suitable crosslinking within the PSA layer in accordance with the composition of the PSA composition. Examples of the crosslinking agent that can be used include isocyanate-based crosslinking agent, epoxy-based crosslinking agent, oxazoline-based crosslinking agent, aziridine-based crosslinking agent, carbodiimide-based crosslinking agent, melamine-based crosslinking agent, urea-based crosslinking agent, metal alkoxide-based crosslinking agent, metal chelate-based crosslinking agent, metal salt-based crosslinking agents, hydrazine-based crosslinking agent, and amine-based crosslinking agent. These can be used solely as one species or in a combination of two or more species.

The crosslinking agent content (when two or more crosslinking agents are included, the total amount thereof) is not particularly limited. From the standpoint of obtaining a PSA that exhibits well-balanced adhesive properties such as adhesive strength and cohesive strength, the crosslinking agent content is suitably about 5 parts by weight or less to 100 parts by weight of the monomers forming the polymer (e.g., an acrylic polymer or the monomers thereof) in the PSA layer, preferably about 0.001 part to 5 parts by weight, more preferably about 0.001 part to 4 parts by weight, or yet more preferably about 0.001 part to 3 parts by weight. Alternatively, the PSA composition can also be free of aforementioned crosslinking agents. When using a photo-curable PSA composition as the PSA composition disclosed herein, the PSA composition can be essentially free of a crosslinking agent such as an isocyanate-based crosslinking agent. Here, that the PSA composition is essentially free of a crosslinking agent (typically an isocyanate-based crosslinking agent) means that the amount of crosslinking agent relative to 100 parts by weight of the monomers is less than 0.05 part by weight (e.g., less than 0.01 part by weight).

To allow an aforementioned crosslinking reaction to proceed effectively, a crosslinking catalyst may be used. Examples of the crosslinking catalyst include metal-based crosslinking catalysts such as tetra-n-butyl titanate, tetraisopropyl titanate, ferric acetylacetonate, butyltin oxide, and dioctyltin dilaurate. In particular, a tin-based crosslinking catalyst such as dioctyltin dilaurate is preferable. The amount of crosslinking catalyst used is not particularly limited. To 100 parts by weight of the monomers forming the polymer (e.g., an acrylic polymer or the monomers thereof) in the PSA layer, the amount of crosslinking catalyst used can be, for instance, about 0.0001 part or greater and 1 part by weight or less, 0.001 part or greater and 0.1 part by weight or less, or 0.005 part by weight or greater and 0.5 part by weight or less.

The PSA composition used for forming the PSA layer can include, as desired, a keto-enol tautomeric compound as a crosslinking retarder. For instance, in a PSA composition including an isocyanate-based crosslinking agent or a PSA composition usable upon addition of isocyanate-based crosslinking agent, it is preferable to use a keto-enol tautomeric compound. This can be effective in extending the PSA composition's pot life. For the keto-enol tautomeric compound, solely one species or a combination of two or more species can be used. The amount of the keto-enol tautomeric compound used to 100 parts by weight of the monomers forming the polymer (e.g., an acrylic polymer or the monomers thereof) in the PSA layer is, for instance, possibly 0.1 part by weight or greater and 20 parts by weight or less, suitably 0.5 part by weight or greater and 15 parts by weight or less, for instance, possibly 1 part by weight or greater and 10 parts by weight or less, or even 1 part by weight or greater and 5 parts by weight or less.

(Tackifier Resin)

The PSA layer may comprise a tackifier resin. Examples of the tackifier resin include rosin-based tackifier resins, rosin derivative tackifier resins, petroleum-based tackifier resins, terpene-based tackifier resins, phenolic tackifier resins, and ketone-based tackifier resins. These can be used singly as one species or in a combination of two or more species.

In some embodiments of the PSA sheet disclosed herein, as the tackifier resin, one, two or more species can be preferably used among a rosin-based tackifier resin, rosin derivative tackifier resin and terpene-phenol resin. Among them, a rosin derivative tackifier resin is preferable. Favorable examples include rosin esters such as stabilized rosin esters and polymerized rosin esters. For instance, the tackifier resin is preferably used in a solvent-based or water-dispersed PSA.

The softening point of the tackifier resin is not particularly limited. From the standpoint of inhibiting a decrease in cohesive strength of the PSA layer, it is preferable to use a tackifier resin having a softening point of 80° C. or higher. The softening point of the tackifier resin can be 90° C. or higher, 100° C. or higher, 110° C. or higher, or even 120° C. or higher. A tackifier resin having a softening point of 130° C. or higher, or 140° C. or higher can be used as well. From the standpoint of the transparency and the tightness of adhesion to adherend, a tackifier resin having a softening point of 200° C. or lower, or 180° C. or lower can be preferably used. As the softening point of a tackifier resin as referred to herein, the nominal value given in a reference or catalog can be used. If no nominal value is available, the softening point of the tackifier resin can be determined based on the softening point test method (ring and ball method) specified in JIS K5902 or JIS K2207.

For favorable effect of the use, the amount of tackifier resin used to 100 parts by weight of the monomers forming the polymer in the PSA layer is suitably 1 part by weight or greater, possibly 5 parts by weight or greater, 10 parts by weight or greater, 15 parts by weight or greater, 20 parts by weight or greater, or even 25 parts by weight or greater. From the standpoint of combining well-balanced cohesion and tightness of adhesion to adherend, the amount of tackifier resin used to 100 parts by weight of the monomers can be, for instance, 70 parts by weight or less, 50 parts by weight or less, or even 40 parts by weight or less. Alternatively, the tackifier resin content in the PSA layer can be, for instance, less than 10 parts by weight or even less than 5 parts by weight to 100 parts by weight of the monomers. The tackifier resin content can be less than 1 part by weight (e.g., less than 0.5 part by weight), or even less than 0.1 part by weight (0 part by weight or greater and less than 0.1 part by weight). The PSA layer can be essentially free of a tackifier resin.

(Acrylic Oligomer)

From the standpoint of increasing the cohesive strength, enhancing the adhesion to the surface (e.g., possibly the surface of a support layer, etc.) adjacent to the PSA layer, etc., the PSA layer may include an acrylic oligomer. As the acrylic oligomer, it is preferable to use a polymer having a higher Tg than the Tg of the acrylic polymer. For instance, in an embodiment using UV irradiation for preparing the PSA layer, an acrylic oligomer is favorable as it is less likely to cause inhibition of polymerization.

The acrylic oligomer's Tg is not particularly limited. It can be, for instance, about 20° C. or higher and 300° C. or lower. The Tg can also be, for instance, about 30° C. or higher, about 40° C. or higher, about 60° C. or higher, about 80° C. or higher, or even about 100° C. or higher. With increasing acrylic oligomer's Tg, the effect to increase the cohesive strength generally tends to improve. From the standpoint of the anchoring properties to the support layer, impact absorption, etc., the acrylic oligomer's Tg can be, for instance, about 250° C. or lower, about 200° C. or lower, about 180° C. or lower, or even about 150° C. or lower. Similar to the acrylic polymer's Tg corresponding to the monomer composition, the acrylic oligomer's Tg value is determined by the Fox equation.

The acrylic oligomer may have a Mw of typically about 1000 or higher and lower than about 30000, preferably about 1500 or higher and lower than about 10000, or yet more preferably about 2000 or higher and lower than about 5000. With the Mw in these ranges, favorable effect is likely to be obtained to enhance the cohesion and the adhesion to the adjacent surface. The acrylic oligomer's Mw can be measured by gel permeation chromatography (GPC) and determined based on standard polystyrene. Specifically, it is measured at a flow rate of about 0.5 mL/min, using two TSKgelGMH-H (20) columns as columns and tetrahydrofuran solvent on HPLC 8020 available from Tosoh Corporation.

Examples of the monomers forming the acrylic oligomer include (meth)acrylate monomers such as the aforementioned various $C_{1-20}$ alkyl (meth)acrylates; the aforementioned various alicyclic hydrocarbon group-containing (meth)acrylates; the aforementioned various aromatic hydrocarbon group-containing (meth)acrylates; and (meth) acrylates obtained from terpene-derived alcohols. These can be used solely as one species or in a combination of two or more species.

Examples of favorable acrylic oligomers include homopolymers of various monomers such as dicyclopentanyl methacrylate (DCPMA), cyclohexyl methacrylate (CHMA), isobornyl methacrylate (IBXMA), isobornyl acrylate (IBXA), dicyclopentanyl acrylate (DCPA), 1-adamantyl methacrylate (ADMA) and 1-adamantyl acrylate (ADA) as well as a copolymer of DCPMA and MMA, copolymer of DCPMA and IBXMA, copolymer of ADA and methyl methacrylate (MMA), copolymer of CHMA and isobutyl methacrylate (IBMA), copolymer of CHMA and IBXMA, copolymer of CHMA and acryloylmorpholine (ACMO), copolymer of CHMA and diethylacrylamide (DEAA), and copolymer of CHMA and AA.

The acrylic oligomer can be formed by polymerizing its constituent monomers. The polymerization method and the polymerization conditions are not particularly limited. Various heretofore known polymerization methods (e.g., solution polymerization, emulsion polymerization, bulk polymerization, photopolymerization, radiation polymerization, etc.) can be employed under suitable conditions. The types of polymerization initiator (e.g., azo polymerization initiator) that can be used as necessary are essentially the same as those exemplified for the synthesis of the acrylic polymer. The amount of polymerization initiator and the amount of chain transfer agent (e.g., a mercaptan) used optionally are suitably selected based on common technical knowledge so as to obtain a desirable molecular weight. Thus, details are omitted.

When the PSA layer includes an acrylic oligomer, its amount included can be, for instance, 0.01 part by weight or greater to 100 parts by weight of the base polymer (typically an acrylic polymer). From the standpoint of obtaining greater effect, it may be 0.05 part by weight or greater, or 0.1 part by weight or greater, or even 0.2 part by weight or greater. From the standpoint of the compatibility with the base polymer, etc., the acrylic oligomer content is suitably less than 50 parts by weight, preferably less than 30 parts by weight, more preferably 25 parts by weight or less, for instance, possibly 10 parts by weight or less, 5 parts by weight or less, or even 1 part by weight or less.

(Silane Coupling Agent)

The PSA layer disclosed herein may comprise a silane coupling agent. In a silane coupling agent-containing embodiment, the PSA composition (further the PSA layer) preferably comprises the silane coupling agent in the free state. For the silane coupling agent, solely one species or a combination of two or more species can be used. The amount of silane coupling agent in the PSA layer disclosed herein can be selected to obtain the desired effect of the use and is not particularly limited. The art disclosed herein can be implemented in an embodiment using a PSA composition essentially free of a silane coupling agent. By limiting or avoiding the use of silane coupling agent, the increase in adhesive strength with aging can be reduced and good water-peeling properties are readily obtained.

(Photopolymerization Initiator)

The PSA layer of the PSA sheet disclosed herein can comprise a photopolymerization initiator as necessary for enhancing or providing photo-curing properties, etc. As the photopolymerization initiator, similar to the examples of photopolymerization initiators usable for synthesizing the acrylic polymer, it is possible to use ketal-based photopolymerization initiators, acetophenone-based photopolymerization initiators, benzoin ether-based photopolymerization initiators, acylphosphine oxide-based photopolymerization initiators, α-ketol photopolymerization initiators, aromatic sulfonyl chloride-based photopolymerization initiators, photoactive oxime-based photopolymerization initiators, benzoin-based photopolymerization initiators, benzylic photopolymerization initiators, benzophenone-based photopolymerization initiators, and thioxanthone-based photopolymerization initiators. For the photopolymerization initiator, solely one species or a combination of two or more species can be used.

The amount of photopolymerization initiator in the PSA layer is not particularly limited and can be selected to suitably obtain the desired effect. In some embodiments, relative to 100 parts by weight of acrylic polymer, the photopolymerization initiator content is, for instance, possibly about 0.005 part by weight or greater, suitably 0.01 part by weight or greater, or possibly even 0.05 part by weight or greater. Increased photopolymerization initiator content enhances the PSA layer's photocuring properties. The photopolymerization initiator content relative to 100 parts by weight of acrylic polymer is suitably 5 parts by weight or less, preferably 1 part by weight or less, possibly 0.5 part by weight or less, or even 0.1 part by weight or less. In view of increasing the PSA sheet's storage stability (e.g., stability against photodegradation), it may be advantageous that the photopolymerization initiator content is not too high The PSA layer comprising a photopolymerization initiator can be formed using a PSA composition (e.g., a solvent-based PSA composition) comprising the photopolymerization initiator. The photopolymerization initiator-containing PSA composition can be prepared, for instance, by mixing the photopolymerization initiator with other components used for the composition. When the PSA composition is prepared using an acrylic polymer synthesized (photopolymerized) in the presence of a photopolymerization initiator, the residue (unreacted residue) of the photopolymerization initiator used in the acrylic polymer synthesis can be used as part or all of the photopolymerization initiator included in the PSA layer. The same applies to a case using, as the acrylic oligomer used as necessary, a species synthesized in the presence of a photopolymerization initiator. From the standpoint of the ease of production management, in some embodiments, the PSA layer may be formed using a PSA composition prepared with a fresh addition of an aforementioned amount of photopolymerization initiator.

(Other Components)

As necessary, the PSA layer disclosed herein may include, as optional components, various additives generally used in the field of PSA, such as viscosity-adjusting agent (e.g., thickener), leveling agent, plasticizer, filler, colorant including pigment and dye, etc., stabilizing agent, preservative, anti-aging agent, and so on. With respect to these various additives, those heretofore known can be used according to typical methods. Since these do not particularly characterize the present invention, details are omitted.

In the art disclosed herein, the amounts of non-base-polymer components (other components besides the base polymer) in the PSA layer (favorably an acrylic polymer) may be limited. In the art disclosed herein, the amounts of non-base-polymer components in the PSA layer is, for instance, about 30% by weight or less, suitably about 15% by weight or less, or preferably about 12% by weight or less (e.g., about 10% by weight or less). The PSA layer having such a composition is likely to satisfy certain optical properties (e.g., transparency) and can be preferably used for optical applications. In some embodiments, the amounts of non-base-polymer components in the PSA layer can be about 5% by weight or less, about 3% by weight or less, or even about 1.5% by weight or less (e.g., about 1% by weight or less). The composition having such limited amounts of other components besides the base polymer (e.g., an acrylic polymer) can be preferably employed for the photocurable PSA composition.

(Formation of PSA Layer)

The PSA layer constituting the PSA sheet may be a cured layer of the PSA composition. In other words, the PSA layer can be formed by providing (e.g., applying) the PSA composition to a suitable surface and then subjecting it to a suitable curing process. When two or more different curing processes (drying, crosslinking, polymerization, etc.) are carried out, these can be done at the same time or in stages.

When a partial polymer (acrylic polymer syrup) of the monomers is used for the PSA composition, a final copolymerization reaction is typically carried out as the curing process. That is, the partial polymer is subjected to a further copolymerization reaction to form a fully polymerized product. For instance, when drying is necessary with a photocurable PSA composition (e.g., in case of a photocurable PSA composition in a form of partial polymer of monomers dissolved in an organic solvent), photoirradiation can be carried out after the composition is allowed to dry.

With respect to a PSA composition using a fully polymerized product, processes such as drying (drying with heat) and crosslinking are typically carried out as necessary as the curing process. As for a solvent-based PSA composition provided with photocuring properties (photo-crosslinking properties) by addition of a polyfunctional monomer, photocuring can be carried out after the composition is allowed to dry, possibly after the PSA sheet obtained after the drying is applied to an adherend. The PSA sheet disclosed herein can be used in an embodiment where it is applied to an adhered by a method that includes photocuring after it is applied to the adherend.

The PSA layer having a multilayer structure with two or more layers can be prepared by adhering pre-formed PSA layers together. Alternatively, it can be prepared by applying a PSA composition can be applied onto a pre-formed first PSA layer and allowed to cure to form a second PSA layer. When the PSA layer has a multilayer structure in the PSA sheet used in the embodiment where photocuring is carried out after it is applied to the adherend, the PSA layer to be photocured can be a particular layer (e.g., a single layer) or all layers of the multilayer structure.

The PSA composition can be applied with, for example, a conventional coater such as a gravure roll coater, a reverse roll coater, a kiss-roll coater, a dip roll coater, a bar coater, a knife coater and a spray coater. With respect to a PSA sheet having a support layer, as the method for providing a PSA layer onto the support layer, it is possible to use a direct method where the PSA composition is directly provided to the support layer or a transfer method where a PSA layer formed on a release face is transferred to the support layer.

(Thickness of PSA Layer)

The thickness of the PSA layer is not particularly limited. It can be, for instance, about 3 μm to 2000 μm. From the standpoint of the conformability to contours and the tightness of adhesion to adherend, in some embodiments, the thickness of the PSA layer is, for instance, possibly 5 μm or greater, suitably 10 μm or greater, preferably 20 μm or greater, or more preferably 30 μm or greater. In some embodiments, the thickness of the PSA layer can also be 50 μm or greater, greater than 50 μm, 70 μm or greater, 100 μm or greater, or even 120 μm or greater. From the standpoint of preventing the occurrence of leftover adhesive residue due to cohesive failure of the PSA layer, in some embodiments, the thickness of the PSA layer can be, for instance, 1000 μm or less, 700 μm or less, 500 μm or less, 300 μm or less, even 200 μm or less, or 170 μm or less. The art disclosed herein can also be favorably implemented in an embodiment of a PSA sheet whose PSA layer has a thickness of possibly 130 μm or less, 90 μm or less, or 60 μm or less (e.g., 40 μm or less). According to the art disclosed herein, during removal, the water-peeling properties can be utilized to peel the PSA sheet with a low load; and therefore, for instance, even in an embodiment where the PSA layer has a limited thickness, the occurrence of defects due to insufficient strength such as tearing can be prevented. When the PSA sheet disclosed herein has a PSA layer on each face of a middle layer, the two PSA layers may have the same or different thicknesses.

<Middle Layer>

The PSA sheet according to some embodiments may have a middle layer placed between the first and second PSA layers forming the surface of the PSA sheet. In the art disclosed herein, the middle layer is not particularly limited. It can be a support (support layer) to support a PSA layer as described later, or a viscoelastic layer (possibly a PSA) placed on the backside of the PSA layer disclosed herein. With the middle layer, it is possible to preferably obtain a PSA sheet capable of showing the effect of the art disclosed herein.

(Middle Layer's Stress at 100% Elongation)

In the embodiment of the PSA sheet having a middle layer, the middle layer has a stress at 100% elongation of less than 30 MPa. By this, the PSA sheet can have a stress at 100% elongation of less than 30 MPa. The stress at 100% elongation is suitably 15 MPa or less, for instance, possibly 10 MPa or less. In some embodiments, the middle layer has a stress at 100% elongation of preferably 7 MPa or less, more preferably 5 MPa or less, yet more preferably 3 MPa or less. In some preferable embodiments, the middle layer has a stress at 100% elongation of 1.0 MPa or less, possibly 0.7 MPa or less, 0.5 MPa or less, 0.3 MPa or less, or even 0.20 MPa or less. The minimum stress at 100% elongation is not particularly limited. From the standpoint of the efficiency of the PSA sheet application and prevention of tearing, etc., it is suitably 0.01 MPa or greater, for instance, possibly 0.05 MPa or greater, or even 0.10 MPa or greater.

(Middle Layer's Stress at 500% Elongation)

While no particular limitations are imposed, the middle layer may have a stress at 500% elongation of 50 MPa or less (e.g., 30 MPa or less). The PSA sheet having such a middle layer tends to have excellent pulling removability. The stress at 500% elongation is suitably 15 MPa or less, for instance, possibly 10 MPa or less. In some embodiments, the middle layer has a stress at 500% elongation of preferably 7 MPa or less, possibly 5 MPa or less, or even 3 MPa or less (e.g., 1.0 MPa or less). The minimum stress at 500% elongation is not particularly limited. From the standpoint of the efficiency of PSA sheet application and prevention of tearing, etc., it is suitably 0.05 MPa or greater, for instance, possibly 0.10 MPa or greater, or even 0.50 MPa or greater.

(Middle Layer's Fracture Stress of)

In the art disclosed herein, from the standpoint of preventing tearing by pulling, the middle layer has a fracture stress σf of possibly 0.10 MPa or greater, suitably 0.20 MPa or greater (e.g., 0.30 MPa or greater), also possibly 0.50 MPa or greater, 0.80 MPa or greater, 1.00 MPa or greater, or even 1.20 MPa or greater (e.g., 1.50 MPa or greater). The PSA sheet that has a middle layer having such a fracture stress σf tends to have excellent processability. In some embodiments, the fracture stress σf can also be 2.0 MPa or greater, 3.0 MPa or greater, 10 MPa or greater, or even 20 MPa or greater (e.g., 25 MPa or greater). The maximum fracture stress σf of the middle layer is not particularly limited. It is possibly 200 MPa or less, suitably 150 MPa or less, also possibly 100 MPa or less, or even 30 MPa or less. In some embodiments, the PSA sheet's fracture stress σf can be 50 MPa or less. From the standpoint of obtaining suitable stretchability, it is suitably 15 MPa or less, possibly 8 MPa or less, or even 6 MPa or less (e.g., 5 MPa or less). In some embodiments, the fracture stress σf can also be 3.00 MPa or less, or even 2.00 MPa or less. According to the art disclosed herein, during peeling removal, the water-peeling properties can be utilized to peel the PSA sheet with a low load; and therefore, without excessively increasing the fracture stress of, that is, in an embodiment having a relatively low fracture stress of, the occurrence of defects due to insufficient strength such as tearing can be prevented.

(Middle Layer's Fracture Strain εf)

In the art disclosed herein, from the standpoint of obtaining stretchability suited for the water-peeling properties, the middle layer has a fracture strain εf(elongation at break) of possibly 150% or higher, suitably 250% or higher (e.g., 280% or higher), preferably 300% or higher, more preferably 400% or higher, yet more preferably 500% or higher, also possibly 600% or higher, 800% or higher, or even 1000% or higher (e.g., 1500% or higher). The maximum fracture strain εf is not particularly limited. From the standpoint of obtaining good tearing resistance, handling properties, workability and so on while having suitable strength, it can be, for instance, 2000% or lower, 1200% or lower, 1000% or lower, 900% or lower, or even 800% or lower.

The middle layer's mechanical properties (stress at 100% elongation, stress at 500% elongation, fracture stress σf and fracture strain εf) are determined based on a tensile test carried out at a tensile speed of 100 mm/min. More specifically, they are determined by the same method as the method (tensile test) for determining the mechanical properties of PSA sheets described later in Examples. The mechanical properties can be set and adjusted by suitably selecting, based on this Description, the middle layer's material species and formation methods, etc.

As the middle layer, it is possible to use various kinds of material capable of bringing about a PSA sheet showing prescribed mechanical properties. As the middle layer, for instance, a resin film can be preferably used. As the middle layer, a stretchable woven or nonwoven fabric can be used. The resin film can be a non-foamed resin film, rubber-like film, foamed film, etc. In particular, a non-formed resin film and rubber-like film are preferable: a non-foamed resin film is more preferable. The non-foamed resin film is essentially free of bubbles (voids) which can be weak points in terms of mechanical strength and tends to have greater mechanical strength (e.g., tensile strength, etc.) than a foam. The non-foamed resin film is also superior in terms of processability, size stability, thickness precision, costs, etc.

As used herein, the "resin film" is an essentially non-porous film and is conceptually distinct from the so-called nonwoven fabric and woven fabric (i.e., nonwoven and woven fabrics are conceptually excluded). The term non-foamed resin film refers to a resin film that has not been subjected to an intentional treatment to make a foam. In particular, the non-foamed resin film can be a resin film having an expansion ratio below 1.1 (e.g., below 1.05, typically below 1.01).

Favorable examples of the resin material forming the resin film that can make the middle layer include acrylic resins such as acrylic copolymers: polyurethane-based resins such as ether-based polyurethanes, ester-based polyurethanes and carbonate-based polyurethanes; urethane (meth) acrylate-based polymers: polyolefinic resins such as polyethylene (PE), polypropylene (PP), ethylene-propylene copolymers and ethylene-butene copolymers: polyester-based resins such as polybutylene terephthalate (PBT): polycarbonate resins; vinyl chloride-based resins (PVC) such as soft polyvinyl chloride; and silicone such as silicone rubber. The resin material can also be a styrene-based copolymer (typically a styrene-based elastomer) such as a styrene-butadiene copolymer, styrene-isoprene copolymer, styrene-ethylene-butylene copolymer, styrene-ethylene-propylene copolymer, styrene-butadiene-styrene copolymer and styrene-isoprene-styrene copolymer, or an acrylic rubber. For the resin material, solely one species or a combination of two or more species can be used. The resin material generally encompasses so-called rubber and thermoplastic elastomer.

In some preferable embodiments, the middle layer is formed from an acrylic resin. The use of the acrylic resin is likely to result in a highly transparent middle layer suited for optical applications. For instance, it is preferable to use an acrylic block copolymer having a hard segment (A) and a soft segment (B) in one molecule. In the structure of the acrylic block copolymer, the hard segment (A) refers to a relatively hard block in relation to the soft segment (B) in the acrylic copolymer. In the structure of the acrylic copolymer, the soft segment (B) refers to a relatively soft block in relation to the hard segment (A). For the acrylic block copolymer, solely one species or a combination of two or more species can be used.

As the acrylic block copolymer, it is preferable to use a species having at least one acrylate block (or Ac block, hereinafter) and at least one methacrylate block (or MAc block, hereinafter). For instance, a preferable block copolymer has a structure having alternating Ac blocks and MAc blocks.

Examples of the Ac block-forming alkyl acrylate include an alkyl acrylate having an alkyl group with 1 to 20 carbon atoms (preferably 4 to 14, e.g., 6 to 12). Examples include methyl acrylate, ethyl acrylate, n-propyl acrylate, isopropyl acrylate, n-butyl acrylate (BA), isobutyl acrylate, tert-butyl acrylate, n-pentyl acrylate, n-hexyl acrylate, n-heptyl acrylate, n-octyl acrylate, 2-ethylhexyl acrylate (2EHA), nonyl acrylate, isononyl acrylate, decyl acrylate, dodecyl acrylate and stearyl acrylate. These can be used singly as one species or in a combination of two or more species.

Examples of the MAc block-forming alkyl methacrylate include an alkyl methacrylate having an alkyl group with 1 to 20 carbon atoms (preferably 1 to 14). Specific examples thereof include methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, n-heptyl methacrylate, n-octyl methacrylate, 2-ethylhexyl methacrylate, nonyl methacrylate, isononyl methacrylate, decyl methacrylate, dodecyl methacrylate and stearyl methacrylate. These can be used singly as one species or in a combination of two or more species.

The acrylic block copolymer may have alternately copolymerized A blocks and B blocks such as AB, ABA, ABAB and ABABA, with the A block (hard segment (A)) formed of a polymer having a hard structure with excellent cohesive strength and elasticity, and the B block (soft segment (B)) formed of a polymer having a soft structure with excellent viscosity.

As the hard segment (A), an aforementioned MAc block can be preferably used. As the soft segment (B), an aforementioned Ac block can be preferably used. In some preferable embodiments, the acrylic block copolymer is a triblock copolymer having a MAc block/Ac block/MAc block (ABA) structure. For instance, it is preferable to use such a triblock copolymer in which the two MAc blocks have essentially the same monomer composition.

The weight ratio between the hard segment (A) and the soft segment (B) in the acrylic block copolymer is not particularly limited. For instance, the hard segment (A) to soft segment (B) weight ratio (A/B) is possibly in the range of 4/96 to 90/10, suitably in the range of 7/93 to 70/30, or preferably in the range of 10/90 to 50/50 (e.g., 15/85 to 40/60).

In the art disclosed herein, the weight average molecular weight (Mw) of the acrylic block copolymer is not particularly limited. For instance, it is preferable to use a species with about $3\times10^4$ to $30\times10^4$ Mw. The acrylic block copolymer's Mw is preferably in the range of about $3.5\times10^4$ to $25\times10^4$, or more preferably in the range of $4\times10^4$ to $20\times10^4$ (e.g., $4.5\times10^4$ to $15\times10^4$). When the acrylic block copolymer's Mw is in a suitable range, the target stretchability and strength are likely to be obtained. Here, the acrylic block copolymer's Mw refers to the value based on polystyrene standards, determined by GPC analysis of a sample prepared by dissolving the copolymer in tetrahydrofuran (THF). In particular, the GPC analysis can be carried out, using, for instance, HLC-8120GPC available from Tosoh Corporation as the GPC analyzer.

Such an acrylic block copolymer can be synthesized by a known method (e.g., see Japanese Patent Application Publication Nos. 2001-234146 and H11-323072); or a commercial product can be obtained and used. Examples of the commercial product include the KURARITY LA® series and the KURARITY LK® series available from Kuraray Co., Ltd., and NABSTAR® available from Kaneka Corporation. As the method for synthesizing the acrylic block copolymer, it is preferable to use a method utilizing living polymerization.

In other embodiments, the acrylic resin layer that can make a middle layer can be formed by the same method as the acrylic PSA layer described earlier. Using the materials that can be used in the PSA layer, a middle layer having prescribed stretchability and strength can be formed. The details are the same as described regarding the PSA layer. Thus, redundant description is omitted.

In other preferable embodiments, the middle layer is formed of a polyurethane-based resin film. Here, the polyurethane-based resin film refers to a resin film comprising polyurethane as the primary resin component (the highest-content component, typically, a component accounting for more than 50% by weight: the same applies, hereinafter). The polyurethane-based resin film is typically formed of a material showing essentially no yield point and is a film material likely resulting in a PSA sheet showing prescribed fracture strength and elongation. The polyurethane-based resin film can also make a preferable middle layer material in that it can obtain good physical properties without addition of additive(s) such as plasticizer, thereby avoiding bleed-out of the additive(s).

The polyurethane content in the resin components of the polyurethane-based resin film is preferably 70% by weight or higher (e.g. 80% by weight or higher, typically 90% by weight or higher and 100% by weight or lower). The polyurethane-based resin film disclosed herein may be a film formed of a polymer blend of polyurethane and other resin. The other resin can be one, two or more species among an acrylic resin, polyolefin, polyester, polycarbonate, etc. Alternatively, the art disclosed herein can also be implemented in an embodiment using a middle layer essentially free of other resin components besides polyurethane. The polyurethane is a polymer synthesized by polyaddition reaction of a polyol (e.g., diol) and a polyisocyanate (e.g., diisocyanate) at a suitable ratio. The polyurethane's NCO/OH ratio can be suitably set to obtain desired mechanical properties.

As for the polyurethane-based resin, a film molded from a product synthesized by a known method can be used, or a commercial product can be obtained and used. Examples of the commercial product include the ESMER URS® series available from Nihon Matai Co., Ltd., polyurethane-based resins and polyurethane-based resin films available from Kurabo Industries, Ltd.

In other preferable embodiments, the middle layer is formed of a resin film comprising a urethane (meth)acrylate-based polymer. As the urethane (meth)acrylate-based polymer disclosed herein, a polymer comprising a structural moiety derived from a urethane (meth)acrylate can be used. Here, the urethane (meth)acrylate refers to a compound having a urethane bond and a (meth)acryloyl group in one molecule and such a compound can be used without particular limitations. For the urethane (meth)acrylate, solely one species or a combination of two or more species can be used. The urethane (meth)acrylate preferably has two or more urethane bonds and two or more (meth)acryloyl groups. The number of (meth)acryloyl groups in the urethane (meth)acrylate is preferably 2 to 5, or more preferably 2 to 3. For instance, a preferable urethane (meth)acrylate has two (meth)acryloyl groups. The urethane (meth)acrylate is preferably a urethane acrylate. Here, the term "urethane acrylate" refers to a urethane (meth)acrylate whose acryloyl groups account for more than 50% (by number) of its (meth)acryloyl groups.

The urethane (meth)acrylate can be synthesized by a known method. As the urethane (meth)acrylate, various commercial urethane (meth)acrylates can be used. For instance, trade name UV-3300B available from Nippon Synthetic Chemical Industry Co., Ltd., and trade name BEAM SET 505A-6 available from Arakawa Chemical Industries, Ltd., can be preferably used.

In other preferable embodiments, the middle layer is formed of a PVC-based resin film. The PVC-based resin film is prepared by molding a film from a PVC-based resin composition (molding material) comprising a PVC-based resin. Here, the PVC-based resin composition refers to a resin composition whose primary resin (polymer) component (i.e., 50% by weight or more) is a PVC-based resin (typically PVC). Of the total resin content in the PVC-based resin composition, the PVC-based resin preferably accounts for about 80% by weight or more (more preferably about 90% by weight or more). Essentially all of the resin content can be PVC. Such a PVC-based resin composition can form a PVC-based resin film showing favorable physical properties as the middle layer.

In other embodiments, the middle layer is formed of a silicone film. As the silicone film material, a silicone rubber is preferable. The silicone rubber is a polysiloxane having a crosslinking structure and rubber-like properties. The silicone rubber can be prepared by reaction of a silicone rubber precursor polysiloxane. The silicone rubber may be formed, for instance, by carrying out the reaction of the silicone rubber precursor comprising an alkenyl group-containing polyorganosiloxane and an organohydrogenpolysiloxane, using a catalyst, etc. As the silicone, a product synthesized by a known method or a commercial product can be used. Various commercial silicone rubbers can be used. For instance, the KEIJU® series available from Mitsubishi Chemical Corporation can be preferably used.

In some embodiments, the middle layer may be formed of a polyolefin resin. As the polyolefin resin, solely one species of polyolefin or a combination of two or more species of polyolefin can be used. Examples of the polyolefin include an α-olefin homopolymer, a copolymer of two or more species of α-olefin, and a copolymer of one, two or more species of α-olefin and another vinyl monomer. Specific examples include polyethylene (PE), polypropylene (PP), poly-1-butene, poly-4-methyl-1-pentene, ethylene-propylene copolymers such as ethylene-propylene rubber (EPR), ethylene-propylene-butene copolymers, ethylene-butene copolymers, ethylene-vinyl alcohol copolymers and ethylene-ethyl acrylate copolymers. Either a low-density (LD) polyolefin or a high-density (HD) polyolefin can be used.

In other embodiments, the middle layer may be formed of an elastomer-based resin film. Here, the elastomer-based resin film refers to a resin film having an elastomer layer. The elastomer layer may comprise an optional suitable resin as long as the target stretchability and strength can be obtained. Examples of such resins include olefinic elastomers and styrene-based elastomers. Preferably, the elastomer layer comprises an olefinic elastomer. With the elastomer layer comprising the olefinic elastomer, it is possible to form an elastomer-based resin film that shows favorable physical properties as the middle layer of the PSA sheet disclosed herein. Specific examples of favorable olefinic elastomers include α-olefinic elastomers. Preferable α-olefinic elastomers include ethylenic elastomers, propylenic elastomers and 1-butenic elastomers.

For instance, as for the α-olefinic elastomer, a commercial product can also be obtained and used. Examples of such commercial products include the TOUGHMER® series available from Mitsui Chemicals, Inc., and the VISTAMAXX® series available from Exxon Mobil Corporation. Among these, a suitable species can be selected and used.

In other embodiments, the middle layer can be a foam film formed of plastic foam (foam of a plastic material). Specific examples of the plastic foam include polyolefinic resin foam; polyester-based resin foam: polyvinyl chloride-based resin foam: vinyl acetate-based resin foam; polyphenylene sulfide resin foam; amide-based resin foam such as aliphatic polyamide (nylon) resin foam and all aromatic polyamide (aramid) resin foam: polyimide-based resin foam: polyetheretherketone (PEEK) foam; styrene-based resin foam such as polystyrene foam; and urethane-based resin foam such as polyurethane resin foam. As the plastic foam, rubber-based resin foam such as polychloroprene rubber foam can also be used.

Examples of preferable foam include polyolefinic resin foam (or "PO foam" hereinafter). As the PO foam-forming plastic material (i.e., a polyolefinic resin), various known or commonly used polyolefinic resins can be used without particular limitations. Examples include polyethylenes such as low-density polyethylene (LDPE), linear low-density polyethylene (LLDPE), and high-density polyethylene (HDPE); polypropylenes, ethylene-polypropylene copolymers, and ethylene-vinyl acetate copolymers. Examples of LLDPE include Ziegler-Natta catalyst-based linear low-density polyethylene and metallocene catalyst-based linear low-density polyethylene. For the polyolefinic resin, solely one species or a suitable combination of two or more species can be used. In some embodiments, it is preferable to use PO foam essentially formed of polyethylenic or polypropylenic resin foam. Here, the polyethylenic resin refers to a resin whose primary monomer (i.e., the primary component among monomers) is ethylene, possibly encompassing HDPE, LDPE, LLDPE, etc., as well as ethylene-propylene copolymer, ethylene-vinyl acetate copolymer and the like having an ethylene copolymerization ratio higher than 50% by weight. Likewise, the polypropylenic resin refers to a resin whose primary monomer is propylene. In particular, polyethylenic foam is preferable.

The method for producing aforementioned polyolefinic foam is not particularly limited. Various known methods can be suitably used. For instance, it can be produced by a method comprising steps of molding, crosslinking and foaming the corresponding polyolefin resin. It may also comprise a stretching step as necessary. Examples of the method for crosslinking polyolefinic foam include a chemical crosslinking method using an organic peroxide and an ionizing radiation crosslinking method involving exposure to ionizing radiation. These methods can be used together. Examples of the ionizing radiation include electron rays, α rays, β rays and γ rays. The dose of ionizing radiation is not particularly limited. It can be set to a suitable radiation dose in view of the target physical properties (e.g., degree of crosslinking), etc.

The middle layer (e.g., resin film) may include, as necessary, various additives such as filler (inorganic filler, organic filler, etc.), colorant (pigment, dye), anti-aging agent, antioxidant, UV absorber, anti-static agent, slip agent, plasticizer and stabilizer. For instance, when using a soft PVC-based resin film as the middle layer, the usage of plasticizer is suitably about 20 parts to 100 parts (more preferably about 30 parts to 70 parts) by weight to 100 parts by weight of the PVC-based resin. The usage of various additives is typically about less than 30% by weight (e.g., less than 20% by weight, typically less than 10% by weight).

The surface of the middle layer (e.g., resin film) can be subjected to a heretofore known surface treatment such as corona discharge treatment, plasma treatment, UV irradiation, acid treatment, base treatment and primer coating. These surface treatments may enhance the tightness of adhesion between the middle layer and the PSA layer, that is, the anchoring of the PSA layer to the middle layer. The primer composition is not particularly limited and can be suitably selected among known kinds. The primer coating thickness is not particularly limited and is suitably about 0.01 μm to 1 μm, or preferably about 0.1 μm to 1 μm. When the middle layer is a polyurethane-based resin film, because of its high surface energy, suitable anchoring can be obtained without an aforementioned surface treatment.

The middle layer may have a monolayer structure or a multilayer structure formed of two, three or more layers. For instance, the middle layer may be substantially formed from such resin film. The middle layer may include a secondary layer in addition to the resin film. Examples of the secondary layer include a layer for adjusting optical properties (such as a colored layer and an antireflection layer), a print layer and laminate layer to provide a desirable appearance to the PSA sheet, a treated surface layer such as an antistatic layer, a primer layer, and a release layer.

As the method for producing the middle layer, a heretofore known film formation method can be suitably employed with no particular limitations. When using a resin film as the middle layer, for instance, heretofore known general film formation methods can be suitably employed, such as extrusion molding, inflation molding, T-die casting and calendar rolling.

The thickness of the middle layer is not particularly limited and can be suitably selected in accordance with the purpose. The middle layer's thickness is, for instance, 10 μm or greater, suitably about 20 μm or greater (e.g., 30 μm or greater), preferably 50 μm or greater, more preferably 70 μm or greater, or possibly even 100 μm or greater (e.g., 120 μm or greater). The middle layer having such a thickness may be less susceptible to tearing and have excellent tensile removability. The middle layer's thickness is possibly 1000 μm or less, suitably 500 μm or less, preferably 300 μm or less, more preferably 200 μm or less (e.g., 150 μm or less), or possibly even 120 μm or less (e.g., 80 μm or less). According to the art disclosed herein, during removal, the water-peeling properties can be utilized to peel the PSA sheet with a low load; and therefore, even in an embodiment where the middle layer has a limited thickness, the occurrence of defects due to insufficient strength such as tearing can be prevented. A thinner middle layer is also advantageous in view of making the PSA sheet thinner, smaller, lighter, resource-saving, and so on.

<Support Layer>

In an embodiment of an adhesively single-faced PSA sheet, the PSA sheet may have a support (support layer) supporting the PSA layer. The support layer is layered on the PSA layer to form the backside of the PSA layer, but otherwise it is basically the same as the aforementioned middle layer. As for the possible materials, formation methods, features (thickness, etc.), properties (e.g., mechanical properties) and so on, the ranges applicable to the middle layer can also be used. Thus, redundant specifications are omitted here.

Of the support layer, the backside (or the reverse side of the side to be bonded to the PSA layer) may be subjected as necessary to a heretofore known surface treatment such as release treatment and antistatic treatment. For instance, by treating the backside of the support layer with a release agent, the unwinding force of the PSA sheet in a rolled form can be reduced. As the release agent, it is possible to use a silicone-based release agent, long-chain alkyl release agent, olefinic release agent, fluorine-based release agent, aliphatic amide-based release agent and molybdenum sulfide, silica powder and the like.

<Additional PSA Layer>

In the PSA sheet disclosed herein, in addition to the PSA layer described above, another PSA layer may be placed. Such a PSA sheet may have one surface (adhesive face) formed of the PSA layer disclosed herein and another surface (adhesive face) formed of another PSA layer. Examples of the PSA sheet include a supportless double-faced PSA sheet having a multilayer structure obtained by laminating two PSA layers and a double-faced PSA sheet obtained by placing a PSA layer on each face of a middle layer. The additionally-placed PSA layer may be formed with the inclusion of, for instance, one, two or more species of PSA selected among various known kinds of PSA such as acrylic PSA, rubber-based PSA (natural rubber-based, synthetic rubber-based, a mixture of these, etc.), silicone-based PSA, polyester-based PSA, urethane-based PSA, polyether-based PSA, polyamide-based PSA and fluorine-based PSA. From the standpoint of the transparency, weatherability, etc., in some embodiments, as the material forming the additional PSA layer, an acrylic PSA can be preferably used. With respect to other features of the additional PSA layer, the same constitution as the aforementioned PSA layer can be employed or a suitable constitution can be used in accordance with the application and purpose based on known or conventional art and common technical knowledge; and therefore, details are omitted here.

<Total Thickness of PSA Sheet>

The total thickness of the PSA sheet disclosed herein (including the PSA layer, middle layer and support layer, but not the release liner if any) is not particularly limited. It is possibly 3 μm or greater, also 5 μm or greater, or suitably 10 μm or greater. From the standpoint of the tightness of adhesion to adherend such as contour-following properties, it is preferably 20 μm or greater, or more preferably 30 μm or greater. In some embodiments, the PSA sheet may have a thickness of 50 μm or greater, greater than 50 μm, 70 μm or greater, 100 μm or greater, or even 120 μm or greater. The PSA sheet having such a thickness may be less susceptible to tearing and have excellent pulling removability. The maximum total thickness of the PSA sheet can be, for instance, 5 mm or less, 3 mm or less, or even 1 mm or less. In some preferable embodiments, the PSA sheet has a thickness of suitably 500 μm or less, preferably 300 μm or less, more preferably 200 μm or less (e.g., 150 μm or less), or possibly even 120 μm or less (e.g., 80 μm or less). According to the art disclosed herein, during removal, the water-peeling properties can be utilized to peel the PSA sheet with a low load; and therefore, even in an embodiment having a thin structure with relatively low strength, the occurrence of defects due to insufficient strength such as tearing can be prevented. A thinner PSA sheet is also advantageous in view of thickness reduction, downsizing, weight reduction, resource-saving, and so on.

<Applications>

The PSA sheet disclosed herein is not particularly limited in application and can be used for various applications. The PSA sheet disclosed herein combines bonding reliability with removability; and therefore, it can be preferably used for various applications necessitating rework, recycle and repair, possibly contributing to increasing product yield, increasing production efficiency, effectively using resources, reducing environmental impact, reducing user costs, etc. The PSA sheet can be used in an embodiment where one surface (adhesive face) thereof is adhered to an adherend or in an application where each surface (adhesive face) is adhered to adherends. In particular, it is preferably used for joining two adherends. In such a use, the PSA sheet can maintain highly reliable adhesion while joining the adherends; and for removal, utilizing the stretchability and water-peeling properties, it can be removed from the adherend with a low load on the adherend (in particular, without causing forceful deformation or damage to the adherend). More specifically, for instance, when one adherend includes a fragile material, by utilizing the PSA sheet's stretchability and water-peeling properties, the adherend can be released from the bonded state without damage to the fragile adherend. For instance, when the adherend is a low-strength rigid adherend such as a thin glass plate, for bonding/fixing, it has bonding reliability based on the sufficient adhesive strength; and when peeled (for removal), it can be peeled without damage to the adherend.

One example of favorable applications is optical application. The PSA sheet disclosed herein may not impair optical properties. Thus, for this feature along with the combined bonding reliability and removability, it can be used in an embodiment where it is applied to, for instance, members constituting various portable devices, automobiles, home electric appliance and the like, for purposes such as fixing, bonding, shaping, decorating, protecting, and supporting these optical members. At least the material forming the surface of the optical member can be, for instance, glass such as an alkaline glass or non-alkaline glass; resin film; metals such as stainless steel (SUS) and aluminum; ceramic materials such as alumina and silica; resin materials such as acrylic resin, ABS resin, polycarbonate resin, polystyrene resin and transparent polyimide resin. The PSA sheet disclosed herein can be applied to a surface coated with an acrylic paint or a paint based on polyester, alkyd, melamine, urethane, acid/epoxy crosslinking, or their composite (e.g., acrylic melamine paint, alkyd melamine paint); or it can also be applied to a plated surface such as a galvanized steel sheet. Favorable examples of the adherend include inorganic materials such as the glass, ceramic materials and metals. The PSA sheet disclosed herein can be, for instance, a component of a PSA sheet-bearing optical member that comprises the PSA sheet and an optical member whose surface is at least partially formed of such a material, wherein the adhesive face of the PSA sheet is bonded to the surface of the optical member.

The optical application in the art disclosed herein can be, for instance, bonding optical members (for optical member bonding) or manufacturing a product (optical product) in which the optical members are used. The PSA sheet disclosed herein can be preferably used as an optical PSA sheet used for these applications.

The optical member refers to a member having optical properties (e.g., polarizability, light refractivity, light scattering properties, light reflectivity, light transmission, light absorption, light diffraction, optical rotation, visibility, etc.). The optical member is not particularly limited as long as it has optical properties. Examples include components of a device (optical device) such as a display device (an image display unit) and an input device as well as a member used for these devices, for instance, a polarizing plate, waveplate, retardation plate, optical compensation film, glaring film, light guide plate, reflective film, anti-reflection film, hard coat (HC) film, impact-absorbing film, anti-fouling film, photochromic film, light control film, transparent conductive film (ITO film), design film, decorative film, surface protection plate, prism, lens, color filter, transparent substrate, and laminates of these (or collectively referred to as "functional films"). The "plate" and "film" individually encompass forms of plate, film, sheet, etc. For instance, the "polarizing film" encompasses a "polarizing plate", "polarizing sheet" and the like.

Examples of the display device include a liquid crystal display device, organic EL (electroluminescence) display device, PDP (plasma display panel), and electronic paper. The art disclosed herein is preferably applied, especially when an expensive member is included, such as a foldable display device and a display device installed in a vehicle. Examples of the input device include a touch panel.

While no particular limitations are imposed, examples of the optical member include members (e.g., members in a form of sheets, films or plates) formed of glass, acrylic resin, polycarbonate, polyethylene terephthalate, metal foil, etc. As used herein, the "optical member" includes a member (design film, decoration film, surface protective film, etc.) that serves to provide decoration or protection while maintaining the visibility of a display device or an input device.

The PSA sheet disclosed herein has high bonding reliability and good peeling removability. Thus, it can be preferably used as a PSA sheet for electronics (favorably, mobile electronics) that require high bonding reliability when in use while requiring smooth removal for parts repair, replacement, examination, recycle and so on. For instance, in mobile electronics such as mobile phones, smartphones, tablet PCs, notebook PCs, various wearable devices (e.g. wrist wearables put on wrists such as wrist watches; modular devices attached to bodies with clips, straps, etc.: eye wears including eye glass types (monocular or binocular, including head-mounted pieces): clothing types worn as, for instance, accessories on shirts, socks, hats/caps, etc.; ear-mounted pieces put on ears such as earphones), digital cameras, digital video cameras, acoustic equipment (portable music players, IC recorders, etc.), computing devices (calculators, etc.), portable game devices, electronic dictionaries, electronic notebooks, electronic books, automotive information systems, portable radios, portable televisions, portable printers, portable scanners, and portable modems; it can be preferably applied for purposes such as fixing the likes of display protection panels (lenses), key modules, antenna modules, rim sheets, decorative panels, batteries, and various other parts (circuit boards, various panel parts, buttons, illuminator parts, internal camera parts, thermal dissipation materials, graphite sheets) and labels (including various marks) such as logos (letter logos) and various designs (symbols). As used herein, to be "mobile," it is not sufficient that it can be just carried, but it needs to be mobile enough for an individual (an average adult) to be able to carry it by hand relatively easily.

The PSA sheet disclosed herein is suitable as a PSA sheet used for fixing batteries (including primary and secondary batteries, e.g., polymer batteries) in electronics (typically mobile electronics). In typical, batteries are often placed in areas requiring their removal for repair, replacement, examination and so on of parts (including batteries). Thus, the battery-fixing PSA sheets require frequent removal. When the PSA sheet is applied for this purpose, while showing good battery-fixing capabilities, for removal of batteries at the end of their performance life, it can be easily removed by the removal method using pulling water-peeling. According to the PSA sheet disclosed herein, using an aforementioned removal method, the PSA sheet can be suitably removed while inhibiting battery deformation.

The PSA sheet disclosed herein is suitable for adhering a fragile material (typically a hard brittle material) such as glass. For instance, the PSA sheet disclosed herein can be preferably used for fixing two adherends in an embodiment where at least one of the adherends is formed of a fragile material such as a glass material. As for a hard brittle material such as glass, being unable to bear the force peeling the PSA sheet adhered thereto, it may get damaged. However, by using the PSA sheet disclosed herein, the PSA sheet can be peeled and removed without causing damage to the adherend such as glass. Specific applications include fixing glass materials such as vehicle front glass and glass windows, adhesively joining glass materials such as antimicrobial glass and a glass window formed of a multilayer glass plate. Favorable applications of the PSA sheet disclosed herein also include fixing a glass part (lens, etc.) to a case or panel having a glass plate as well as adhesively joining glass plates.

The size of a glass plate as the adherend is not limited to a specific range. The glass plate may have a thickness of, for instance, 0.1 mm to 5 mm (e.g., 0.5 mm to 2 mm) and a length of, for instance, 5 mm to 1 m (e.g., 50 mm or greater, further 100 mm or greater, and 500 mm or less). The PSA sheet disclosed herein can be preferably used for adhering a glass plate having such dimensions. The glass plate length refers to the maximum length included in in-plane directions of the glass plate.

The PSA sheet disclosed herein is also suitable as a PSA sheet for fixing articles (interior products such as hooks and mirrors, building materials, etc.) or members (adherends, members to be fixed, members subject to adhesion, etc.) that are adhered to the sorts of wall surfaces, pillars, furniture, home electronics and glass surfaces, and eventually replaced after used for certain time periods. In this application, while showing good fixing capabilities for as long as fixing articles, etc., for their removal, the PSA sheet can be peeled and removed by water-peeling.

<PSA Sheet-Bearing Article or Member>

The PSA sheet disclosed herein can be a component of a PSA sheet-bearing article or member where the article or member is attached to one surface. In such a PSA sheet-bearing article or member, the other face of the PSA sheet may stay protected with a release liner. Alternatively, the PSA sheet may be a component of an article or member, having an object bonded to each face thereof. Such an article or member can be in the form of a laminate having objects A and B as well as a PSA sheet joining the objects A and B. Examples of the article and member include aforementioned articles and their possible members. The same applies to the objects. In some embodiments, the PSA sheet can be a component of a PSA sheet-bearing optical member in which the optical member is bonded to the PSA layer surface. In a preferable optical member, the face to which the PSA sheet is adhered has a non-water-absorbing smooth surface. Examples of the optical member are as described earlier. Of the member, the face applied to the PSA sheet may be subjected to hydrophilicity enhancing treatment. Examples of the hydrophilicity enhancing treatment include treatment that contributes to an increase in hydrophilicity, such as corona treatment, plasma treatment, and hydrophilic coating by which a hydrophilic coating layer is provided.

<Peeling Method>

This Description provides a method for peeling a PSA sheet adhered to an adherend from the adherend. The peeling method include a water-peel step in which the PSA sheet is peeled from the adherend, in a state where an aqueous liquid exits at the interface between the adherend and the PSA sheet at the front line of peeling the PSA sheet from the adherend, with the aqueous liquid allowed to further enter the interface following the movement of the peel front line. Here, the peel front line refers to where the PSA sheet starts to separate from the adherend. According to the water peel step, the PSA sheet can be peeled from the adherend with effective use of the aqueous liquid. The peeling method can be preferably practiced, for instance, in an embodiment where a PSA sheet disclosed herein is peeled from an adherend.

As the aqueous liquid used in the peeling method, water or a mixed solvent primarily comprising water with a small amount of an additive as necessary can be used. As for other solvents forming the mixed solvent besides water, a lower alcohol (e.g., ethanol), lower ketone (e.g., acetone) and the like that are miscible with water can be used. As the additives, known surfactants and the like can be used. From the standpoint of avoiding contamination of the adherend, in some embodiments, an aqueous liquid essentially free of additives can be preferably used. From the standpoint of environmental health, it is particularly preferable to use water as the aqueous liquid. The water is not particularly limited. For instance, distilled water, ion-exchanged water, tap water or the like can be used in view of the purity, availability, etc., required for the application.

In some embodiments, similar to the measurement of water-peel strength described later, for instance, the peeling method can be preferably practiced in an embodiment where the aqueous liquid is supplied near the bonding interface between the PSA sheet adhered to an adherend and the adherend); and after the aqueous liquid is allowed to enter the interface with the adherend, peeling of the PSA sheet is allowed to proceed without another supply of water (i.e. by using only the aqueous liquid supplied onto the adherend before the peel initiation). During the water-peel step, if the water entering the interface between the PSA sheet and the adherend following the movement of the peel front line runs out in the middle of peeling, additional water may be supplied intermittently or continuously after the start of the water-peel step. For instance, when the adherend absorbs water or when the aqueous liquid tends to remain on the post-peel adherend surface or the adhesive face, it may be preferable to employ the embodiment where additional water is supplied after the start of the water-peel step.

The amount of aqueous liquid supplied before the start of peeling is not particularly limited as long as the aqueous liquid can be introduced from the outside of the PSA sheet's bonding area into the interface between the PSA sheet and the adherend. The amount of the aqueous liquid can be, for instance, 5 μL or greater, 10 μL or greater, or even 20 μL or greater. There are no particular limitations to the maximum amount of the aqueous liquid. In some embodiments, from the standpoint of facilitating the work, the amount of the aqueous liquid can be, for instance, 10 mL or less, 5 mL or less, 1 mL or less, 0.5 mL or less, 0.1 mL or less, or even 0.05 mL or less. By reducing the amount of the aqueous liquid, it is possible to omit or simplify removal of the aqueous liquid by drying, wiping, etc., after the PSA sheet is peeled off.

The PSA sheet to be peeled by the peeling method is typically a stretchable PSA sheet comprising a PSA layer. Here, the stretchable PSA sheet refers to a PSA sheet having a stress at 100% elongation of less than 30 MPa. Preferably, it can be a PSA sheet further having a fracture strain εf of 300% or higher. For instance, the PSA sheet is preferably a PSA sheet disclosed herein. Thus, the peeling method is suitable as a method for peeling a PSA sheet disclosed herein. According to such a stretchable PSA sheet, entry of aqueous liquid into the interface between the PSA sheet and the adherend can be greatly facilitated. In particular, because the PSA sheet is stretchable, in the peeling step, for instance, by holding one end (possibly a tab) thereof and pulling the PSA sheet, in the initial stage of pulling, stretching of the PSA sheet creates a gap near the bonding interface with the adherend. Thus, without a special operation such as using a tool (cutting knife, etc.), when aqueous liquid is supplied to the gap created near the bonding interface with the adherend, it can enter where subjected to peeling (separation) in the bonding interface, thereby enabling water-peeling.

The peel angle of the PSA sheet is not particularly limited. For instance, the PSA sheet can be peeled from the adherend at a suitable peel angle in the range between 0° and 180° relative to the bonding surface of the adherend. In an embodiment where the PSA sheet joining two adherends is peeled off the adherends, the peel angle of the PSA sheet can be, for instance, smaller than 90° (0° to below) 90° relative to the bonding surface of one adherend. Because the PSA sheet disclosed herein is stretchable, by pulling it at an angle below 90°, the PSA sheet can be peeled, using the stretchability. Such a peeling mode is also called tensile peeling or tensile removal. The mode of loosening the joint between two adherends joined with a PSA sheet is also called pull-out peeling or pull-out removal. In such a peeling mode, specifically in the initial stage of pulling the PSA sheet, by supplying aqueous liquid to the gap created by stretching of the PSA sheet, that is, by carrying out the peeling operation in the presence of aqueous liquid where subjected to peeling (separation) in the adherend-PSA sheet bonding interface, using the stretchability and water-peeling properties of the PSA sheet, peeling removal of the PSA sheet from the adherend can be smoothly completed with low loads on the adherends. This can be particularly advantageous in that when two adherends are formed of a rigid material and/or a fragile material, the two adherends can be separated without causing forceful deformation or fracture to the adherends.

The peel angle (typically, tensile peel angle) of the PSA sheet can be 0° to below 45° (e.g., 0° to below 30°, further 0° to below) 15°. The PSA sheet disclosed herein may well accommodate a mode of PSA sheet pulling at a non-parallel angle (e.g., an angle from 45° up to 90°, e.g., an angle above 45° and below) 90° relative to the bonding surface, due to the surrounding structures of the PSA sheet joint, etc.

The water-peel step according to some embodiments can be preferably implemented in an embodiment where the peel front line is allowed to move at a speed of at least 10 mm/min. Moving the peeling front line at a speed of at least 10 mm/min is comparable to peeling the PSA sheet at a tensile speed of at least 20 mm/min, for instance, when the peel angle is 180°. The speed for moving the peeling front line can be, for instance, 25 mm/min or higher, 50 mm/min or higher, 150 mm/min or higher, 300 mm/min or higher, or 500 mm/min or higher. According to the peeling method disclosed herein, the PSA sheet is peeled off from the adherend while allowing the aqueous liquid to enter the interface; and this can bring about good water-peeling properties even at a relatively high peeling speed. The maximum speed at which the peel front line moves is not particularly limited. The speed at which the peel front line moves can be, for instance, 1000 mm/min or lower.

The peeling method disclosed herein can be preferably applied to peeling of a PSA sheet adhered to a non-water-absorbing smooth surface such as a glass plate, a metal plate and a resin plate. The peeling method disclosed herein can be preferably employed as a method for peeling a PSA sheet from an aforementioned optical member. In particular, it is suitable as a method for peeling the PSA sheet adhered on a glass plate, such as alkaline glass and non-alkaline glass.

<Separation Method>

The art disclosed herein includes a method for separating two adherends joined with a stretchable PSA sheet. The method comprises a step of pulling the PSA sheet in a direction to pull it out from between the two adherends, using the stretchability of the PSA sheet. The PSA sheet pulling step is carried out in the presence of aqueous liquid where subjected to peeling (separation) in the bonding interface between the PSA sheet and at least one of the two adherends. According to this method, the aqueous liquid can be used to water-peel and pull out the PSA sheet from between two adherends. Thus, even when the two adherends are formed from a rigid material and/or a fragile material, the two adherends can be separated without causing forceful deformation or fracture to the adherends. The separation method can be a method for loosening adhesion of an adherend or a method for disassembling an adherend. The details of these methods are the same as the peeling method described earlier and the description of the peeling method can be applied. Thus, redundant description is omitted.

The matters disclosed by this description include the following:

(1) A PSA sheet having a PSA layer, the PSA sheet
having a water-peel strength of 2 N/10 mm or less, determined after the adhesive face of the PSA layer is applied to the surface of an alkaline float glass plate adherend having a contact angle of 5° to 10° with distilled water, the resultant is stored at room temperature for one day, 20 μL of distilled water is dropped onto the adherend and the distilled water is allowed to enter an interfacial edge between the adhesive face and the adherend; according to JIS Z0237: 2009 "10.4.1 Method 1:180° Peel Strength to Test Plate": specifically, at a test temperature of 23° C. at a tensile speed of 300 mm/min at a peel angle of 180° using a tensile tester; and
further having a stress at 100% elongation of less than 30 MPa as well as a multiplication product ($\sigma f \cdot \varepsilon f$) of fracture stress $\sigma f$(MPa) and fracture strain $\varepsilon f$ (%) of 250 or greater, wherein the stress at 100% elongation, the fracture stress $\sigma f$ and the fracture strain $\varepsilon f$ are determined based on a tensile test carried out at a tensile speed of 100 mm/min.

(2) A PSA sheet having a PSA layer, wherein
the PSA layer comprises at least one species of compound selected among surfactants and polyoxyalkylene backbone-containing compounds, and
the PSA sheet has a stress at 100% elongation of less than 30 MPa and as well as a multiplication product ($\sigma f \cdot \varepsilon f$) of fracture stress $\sigma f$(MPa) and fracture strain $\varepsilon f$ (%) of 250 or greater, wherein the stress at 100% elongation, the fracture stress $\sigma f$ and the fracture strain $\varepsilon f$ are determined based on a tensile test carried out at a tensile speed of 100 mm/min.

(3) The PSA sheet according to (1) or (2) above, having a normal peel strength of 2.5 N/10 mm or greater and 15 N/10 mm or less, determined after the adhesive face of the PSA layer is applied to the surface of an alkaline float glass plate adherend having a contact angle of 5° to 10° with distilled water, according to JIS Z0237: 2009 "10.4.1 Method 1:180° Peel Strength to Test Plate," specifically, at a test temperature of 23° C. at a tensile speed of 300 mm/min at a peel angle of 180° using a tensile tester.

(4) The PSA sheet according to any of (1) to (3) above, wherein the PSA layer is formed from a PSA composition comprising an acrylic partial polymer, a crosslinking agent and a photopolymerization initiator.

(5) The PSA sheet according to any of (1) to (4) above, wherein the surfactant has an HLB of 10 or higher and 20 or lower.

(6) The PSA sheet according to any of (1) to (5) above, wherein the PSA layer is formed from a water-dispersed PSA composition, a solvent-based PSA composition, an active energy ray-curable PSA composition or a hot-melt PSA composition.

(7) The PSA sheet according to any of (1) to (6) above, wherein the PSA layer is an acrylic PSA layer.

(8) The PSA sheet according to any of (1) to (7) above, that is formed as an adhesively double-faced PSA sheet, wherein the PSA layer constitutes at least one adhesive face of the PSA sheet.

(9) The PSA sheet according to (8) above, having first and second PSA layers, each as the PSA layer; and further having a middle layer placed between the first and second PSA layers.

(10) The PSA sheet according to (9) above, wherein the middle layer is formed of a material comprising an acrylic resin, a polyurethane-based resin, a urethane (meth)acrylate-based polymer, a polyolefinic resin, a polyvinyl chloride-based resin, a silicone, a rubber or an elastomer.

(11) The PSA sheet according to any of (1) to (10) above, wherein the PSA layer comprises less than 1 part by weight of the compound to 100 parts by weight of base polymer therein.

(12) The PSA sheet according to any of (1) to (11) above, that is used in an optical application.

(13) The PSA sheet according to any of (1) to (12) above, wherein the PSA layer has a thickness of 10 μm or greater and 200 μm or less.

(14) The PSA sheet according to any of (1) to (13) above, having a water-peel strength reduction rate of 60% or higher.

(15) The PSA sheet according to any of (1) to (14) above, having a haze value below 0.7%.

(16) A PSA sheet-bearing optical member comprising the PSA sheet according to any of (1) to (15) above, and an optical member bonded to one face of the PSA sheet.

(17) A method for peeling a stretchable PSA sheet adhered on an adherend, the method comprising a step of pulling and peeling the PSA sheet in a <90° direction relative to the adhesive face (bonding interface) with the adherend, wherein the PSA sheet peeling step is carried out in the presence of aqueous liquid where subjected to peeling in the bonding interface between the adherend and the PSA sheet.

(18) The peel method according to (17) above, wherein the PSA sheet is the PSA sheet according to any of (1) to (15) above.

(19) A method for separating two adherends joined with a stretchable PSA sheet, the method comprising a step of pulling the PSA sheet in a direction to pull it out from between the two adherends, using the PSA sheet's stretchability, wherein the PSA sheet pulling step is carried out in the presence of aqueous liquid where subjected to peeling (separation) in the bonding interface between the PSA sheet and at least one of the two adherends.

(20) The separation method according to (19) above, wherein the PSA sheet is the PSA sheet according to any of (1) to (15) above.

EXAMPLES

Several working examples related to the present invention are described below, but these specific examples are not to limit the present invention. In the description below, "parts" and "%" are by weight unless otherwise specified.

<Test Methods>

[Normal Peel Strength]

From a PSA sheet, the release liner covering one face of the PSA layer (a supportless double-faced PSA sheet) is peeled off. To the exposed adhesive face, 25 μm thick polyethylene terephthalate (PET) film is adhered for backing. The resultant is cut to a 20 mm wide 100 mm long size to prepare a test piece.

In an environment at 23° C. and 50% RH, from the test piece, the release liner covering the other face of the PSA layer is peeled off. The exposed adhesive face is press-bonded to an alkaline glass plate as an adherend with a 2 kg rubber roller moved back and forth once. This is autoclaved (50° C., 0.5 MPa, 15 min). Subsequently, in an environment at 23° C. and 50% RH, using a tensile tester, at a tensile speed of 300 mm/min, at a peel angle of 180°, the test piece is subjected to measurement of peel strength on the adherend (the peel strength before proceeding to the water-peel strength measurement described below, i.e., the peel strength in while before distilled water is supplied to the peeling interface). The measurement is repeated three times and their average value is converted to per 10 mm width value (unit: N/10 mm) and the resulting value is used as the normal peel strength (N/10 mm). The normal peel strength measurement is carried out so that peeling of the test piece adhered to the adherend proceeds from bottom up. As the adherend, an alkaline glass plate (product name Microslide Glass S200423 available from Matsunami Glass Ind., Ltd.) can be used. As the tensile tester, a universal tensile/compression testing machine (machine name Tensile & Compression Testing Machine TCM-1 kNB available from Minebea Co., Ltd.) or a comparable product can be used. It is noted that the PET film backing is unnecessary in measurement of a single-faced PSA sheet.

[Water-Peel Strength]

In the normal peel strength measurement, while measuring the peel strength of the test piece on the adherend, 20 μL of distilled water is supplied where the test piece starts to separate (i.e., to the peel front line) and the peel strength after the distilled water supply is measured. The measurement is carried out for every normal peel strength measurement (i.e., three times) and their average value is converted to per 10 mm width value (unit: N/10 mm) and the resulting value is used as the water-peel strength (N/10 mm).

As for the water-peel strength measurement, the normal peel strength and water-peel strength measurements can be carried out serially on every test piece, or one different test pieces. For instance, when it is difficult to obtain a test piece having a sufficient length for carrying out serial measurements, etc., the embodiment of carrying out measurements on different test pieces can be employed. The adherend, tensile tester and other matters are basically the same as the measurement of normal peel strength.

In the measurement of normal adhesive strength and water-peel strength, the adherend used is an alkaline glass plate fabricated by a float method with a surface (to which the test piece is adhered) having a contact angle of 5° to 10° with distilled water. As such an adherend, it is possible to use an alkaline glass plate available from Matsunami Glass Ind., Ltd. Not limited to this, it is also possible to use a comparable product to the alkaline glass plate available from Matsunami Glass Ind., Ltd., or other alkaline glass plates.

The contact angle of the alkaline glass plate is determined by the following method: In an environment at 23° C. and 50% RH (measurement atmosphere), measurement is carried by a drop method, using a contact angle meter (available from Kyowa Interface Science Co., Ltd.; product name DMo-501, control box DMC-2, control/analysis software FAMAS (version 5.0.30)). The amount of distilled water dropped is 2 μL. From an image taken at 5 seconds after distilled water is dropped, the contact angle is determined by the Θ/2 method (conducted 5 times).

[Tensile Test]

A 3 cm wide×5 cm long cut release-linered PSA sheet is obtained as a test piece. The release film is peeled off and the test piece is wound along the long side to prepare a 3 cm long test piece rod. The test piece is placed in an environment at 23° C. and 50% RH. Using a tensile tester, at a chuck distance of 10 mm, at a tensile speed of 100 mm/min, a tensile test is performed on the test piece to determine the stress at 100% elongation (MPa), stress at 500% elongation (MPa), fracture stress of (MPa) and fracture strain εf (%). In the tensile test, the stress at 100% elongation (MPa) and stress at 500% elongation (MPa) are the values obtained by dividing the respective loads (N) measured at 100% and 500% elongations by the test piece cross-sectional area ($mm^2$). The fracture stress σf(MPa) is the value obtained by dividing the load (N) at break of the test piece by the test piece cross-sectional area ($mm^2$). The fracture strain εf (%) is the elongation (%) at break of the test piece. As the tensile tester, a universal tensile/compression testing machine (machine name Tensile & Compression Testing Machine TCM-1 kNB available from Minebea Co., Ltd.) or a comparable product can be used.

When the PSA sheet being measured cannot be wound into a rod, of the PSA sheet, a dumbbell No. 1 shape (based on JIS K 6251, 10 mm wide) is punched out and used as a test piece to carry out the same tensile test as above and determine the stress at 100% elongation (MPa), stress at 500% elongation (MPa), fracture stress σf(MPa) and fracture strain εf (%).

[Reworkability on Rigid Body]

(1) 1.5 cm×5 cm adhesion test

A PSA sheet (double-faced PSA sheet) is cut to a width of 1.5 cm. Over a 1.5 cm×5 cm area of each face, non-alkaline glass (available from Coming Inc., product name Eagle XG, 0.7 mm thick) is adhered as the adherend. In particular, in an environment at 23° C. and 50% RH, one PSA sheet face is exposed and the adherend is adhered over a 1.5 cm×5 cm area and press-bonded with a 2 kg rubber roller moved back and forth once. This is done on each face of the PSA sheet while leaving, at one end of the length (direction) of the PSA sheet, a 1 cm long unadhered segment extending off the two adherends adhered to the PSA sheet. This segment is used as a tab. The resultant is left in the environment at 23° C. and 50% RH. Subsequently, near the bonding interfaces between the adherends and the PSA sheet, water is supplied (in particular, using a dropper, one drop (~20 μL) of water is dropped near the interface on each face of the PSA sheet). The PSA sheet is manually pulled so as to pull it out from between the two adherends and peeled off the adherends at a mostly constant speed over 15 seconds. During this operation, the workability is evaluated based on the following grades:

G: peeling completed

P: heavy peeling not completed in 15 seconds or PSA sheet torn in the middle of peeling (2) 3 cm×5 cm adhesion test A PSA sheet (double-faced PSA sheet) is cut to a width of 3 cm. Over a 3 cm×5 cm area of each face, non-alkaline glass is adhered as the adherend. Otherwise, in the same manner as the 1.5 cm×5 cm adhesion test, the reworkability is evaluated.

With increasing bonding area, the resistance during pulling increases, making the PSA sheet more susceptible to tearing. Thus, the conditions are severer in this test method than in the test method (1) above.

Example 1

Preparation of PSA Composition

Was mixed 100 parts of a monomer mixture containing 54.9% n-butyl acrylate (BA), 11.5% cyclohexyl acrylate (CHA), 22.1% 4-hydroxybutyl acrylate (4HBA), 7.4% hydroxyethyl acrylate (HEA) and 4.1% N-vinyl-2-pyrrolidone (NVP) with 0.3 part of a photopolymerization initiator (available from IGM Resins, product name OMNIRAD 651, 2,2-dimethoxy-1,2-diphenylethane-1-one). Under a nitrogen atmosphere, the reaction mixture was pulse-irradiated by UV rays and photopolymerization was carried out to a viscosity of about 15 Pas (BH viscometer, No. 5 rotor, 10 rpm, measurement temperature 30° C.) to prepare a monomer syrup (~8% conversion) containing a partial polymer of the monomer mixture. To 100 parts of the monomer syrup, were added and uniformly mixed 0.15 part of dipentaerythritol hexaacrylate (DPHA) as a polyfunctional monomer (crosslinking agent) and 0.3 part of a surfactant (polyoxyethylene sorbitan monolaurate, HLB 16.7, product name RHEODOL TW-L120 available from Kao Corporation). The resulting mixture was then degassed to prepare a UV ray-curable PSA composition according to this Example.

Preparation of PSA Sheet

Onto the release face of release film R1 (product name MRF #38 available from Mitsubishi Plastics, Inc.: 38 μm thick), the resulting PSA composition was applied and covered with release film R2 (product name MRF #25 available from Mitsubishi Plastics, Inc.: 25 μm thick) to block air. The resultant was allowed to cure by UV irradiation to form a 150 μm thick PSA layer. The UV irradiation was performed using a black light lamp, at an intensity of 4 $mW/cm^2$ (measured with an industrial UV checker (trade name UVR-T1 available from Topcon Corporation) with peak sensitivity at ~350 nm wavelength) for 180 seconds. In this manner, was obtained a PSA sheet (consisting of the PSA layer) according to this Example. In the PSA sheet of this Example, the faces to be adhered to adherends are protected with release films R1 and R2. It is noted that both release films R1 and R2. Both release liners R1 and R2 are release liners each having a release face (silicone release-treated face) on one side of PET film.

Example 2

Using the monomer composition shown in Table 1, but otherwise in the same manner as Example 1, was prepared a monomer syrup. To 100 parts of the resulting monomer syrup, were added and uniformly mixed 0.1 part of 1,6-hexanediol diacrylate (HDDA) as a polyfunctional monomer and 0.3 part of a surfactant (polyoxyethylene sorbitan monolaurate, HLB 16.7, product name RHEODOL TW-L120 available from Kao Corporation). The resulting mixture was then degassed to prepare a UV ray-curable PSA composition according to this Example. Using the resulting PSA composition, but otherwise in the same manner as Example 1, was obtained a PSA sheet according to this Example.

Examples 3, 4, 6 to 10, 12 and 13

Using the monomer compositions shown in Table 1, but otherwise in the same manner as Example 2, were prepared PSA compositions and were obtained PSA sheets according to the respective Examples. In Table 1, the following abbreviations are used:

BzA: benzyl acrylate

AA-6: macromonomer available from Toagosei Co., Ltd. (product name AA-6, methyl methacrylate segment-containing macromonomer, Mn 6000)

AS-6: macromonomer available from Toagosei Co., Ltd. (product name AS-6, styrene segment-containing macromonomer, Mn 6000)

EBECRYL 3703: product name EBECRYL 3703 available from Daicel-Allnex Ltd. (amine modified bisphenol A epoxy acrylate, average molecular weight 850)

Example 5

As the polyfunctional monomer, in place of HDDA, was used trimethylolpropane triacrylate (TMPTA). Otherwise in the same manner as Example 4, was prepared a PSA composition and was obtained a PSA sheet according to this Example.

Example 11

Using the monomer composition shown in Table 1, but otherwise in the same manner as Example 1, was prepared a monomer syrup. To 100 parts of the resulting monomer syrup, were added and uniformly mixed 12 parts of DPHA and 0.4 part of 3-glycidoxypropyl trimethoxysilane (product name KBM-403 available from Shin-Etsu Chemical Co., Ltd.) as polyfunctional monomers. The resulting mixture was then degassed to prepare a UV ray-curable PSA composition according to this Example. Using the resulting PSA composition, but otherwise in the same manner as Example 1, was obtained a PSA sheet according to this Example.

Example 14

Preparation of PSA Layer

Onto the release face of release film R1 (product name MRF #38 available from Mitsubishi Plastics, Inc.: 38 μm thick), the PSA composition obtained in Example 1 was applied and covered with release film R2 (product name MRF #25 available from Mitsubishi Plastics, Inc.: 25 μm thick) to block air. The resultant was allowed to cure by UV irradiation to form a 50 μm thick PSA layer. The UV irradiation was performed using a black light lamp, at an intensity of 4 $mW/cm^2$ (measured with an industrial UV checker (trade name UVR-T1 available from Topcon Corporation) with peak sensitivity at ~350 nm wavelength) for 180 seconds. In this manner, were prepared two such PSA layers each having both faces protected with two release films. In Table 2, U-1 represents the UV ray-curable PSA used in this Example.

Preparation of Acrylic Polymer Film

In toluene, was dissolved acrylic block copolymer A (trade name KURARITY LA3320 available from Kuraray Co., Ltd., polyMMA-polyBA-polyMMA triblock copolymer: MMA: methyl methacrylate: BA: n-butyl acrylate) to 30% concentration. The resulting polymer solution was applied onto the release face of release film R1 (product name MRF #38 available from Mitsubishi Plastics, Inc.; 38 μm thick) and allowed to dry at 130° C. for 3 min to form a 50 μm thick acrylic polymer layer. To the exposed face of the acrylic polymer layer, was adhered release film R2 (product name MRF #38 available from Mitsubishi Plastics, Inc.: 38 μm thick). In this manner, was prepared acrylic polymer film A1 with both faces protected with two release liners.

Preparation of PSA Sheet

The release films R2 covering the PSA layers were removed. The PSA layers were adhered to the respective faces of acrylic polymer film A1. In particular, upon removal of the release film covering one face of acrylic polymer film A1, to the exposed face of acrylic polymer film A1, was applied one of the PSA layers; and the same procedure was repeated on the other face of acrylic polymer film A1 to adhere the PSA layers to the two faces of acrylic polymer film A1. In this manner, was obtained a PSA sheet (middle layer-containing double-faced PSA sheet) having a PSA layer on each face of acrylic polymer film A1 as the middle layer. In the PSA sheet of this Example, the faces to be adhered to adherends are protected with release films R1.

Example 15

Were laminated acrylic polymer layers formed by the same method as Example 14 to prepare 150 μm thick acrylic polymer film A2. Using the acrylic polymer film A2, but otherwise in the same manner as Example 14, was obtained a PSA sheet according to this Example.

Example 16

Each PSA layer thickness was changed to 100 μm. Otherwise in the same manner as Example 14, was obtained a PSA sheet according to this Example.

Example 17

In toluene, was dissolved acrylic block copolymer B (trade name KURARITY LA2250 available from Kuraray Co., Ltd., polyMMA-polyBA-polyMMA triblock copolymer) to 30% concentration. Using the resulting polymer solution, but otherwise in the same manner as Example 15, was prepared a 150 μm thick acrylic polymer film B1. Using the resulting acrylic polymer film B1, was obtained a PSA sheet according to this Example.

Example 18

Preparation of PSA Composition

In 100 parts of ion-exchanged water, were mixed and emulsified 85 parts of 2-ethylhexyl acrylate (2EHA), 13 parts of methyl acrylate (MA), 1.2 part of acrylic acid (AA), 0.8 part of methacrylic acid (MAA), 0.02 part of 3-methacryloxypropyl trimethoxysilane (product name KBM-503 available from Shin-Etsu Chemical Co., Ltd.), 0.048 part of t-dodecyl mercaptan as a chain transfer agent and 2.0 part of an emulsifier (LATEMUL E-118B available from Kao Corporation) to prepare a monomer mixture as an aqueous emulsion.

Into a reaction vessel equipped with a condenser, nitrogen inlet, thermometer and stirrer, was placed the monomer emulsion. While nitrogen gas is introduced, the resulting mixture was allowed to stir at room temperature for at least one hour. Subsequently, the system was heated to 60° C. and was added 0.1 part of 2,2'-azobis [N-(2-carboxyethyl)-2-methylpropionamidine]hydrate (VA-057 available from Wako Pure Chemical Industries, Ltd.) as polymerization initiator. The reaction was carried out at 60° C. for 6 hours to obtain a water dispersion of acrylic polymer. After the system was cooled to room temperature, was added 30 parts (non-volatiles) of tackifier resin emulsion (product name SUPER ESTER E-865NT available from Arakawa Chemical Industries, Ltd.: a water dispersion of polymerized rosin ester having a softening point of 160° C.). Using 10% aqueous ammonia as pH-adjusting agent and polyacrylic acid (aqueous solution of 36% non-volatiles) as thickener, the pH was adjusted to about 7.5 and the viscosity to about 9 Pa's to prepare an emulsion-based PSA composition.

Preparation of PSA Sheet

Onto release film R1 (product name MRF #38 available from Mitsubishi Plastics, Inc.: 38 μm thick), the resulting PSA composition was applied and allowed to dry at 120° C. for 3 minutes to form a 25 μm thick PSA layer. Two such release-linered PSA layers were obtained and adhered to the respective faces of 150 μm thick acrylic polymer film A2 prepared by the same method as Example 15. In this manner, was obtained a PSA sheet having a PSA layer on each face of acrylic polymer film A2 as the middle layer. In the PSA sheet of this Example, the faces to be adhered to adherends are protected with release films R1. In Table 2, E-1 represents the emulsion-based PSA used in this Example.

Example 19

By the same method as Example 17, using acrylic block copolymer B (trade name KURARITY LA2250 available from Kuraray Co., Ltd., polyMMA-polyBA-polyMMA triblock copolymer), was prepared 50 μm thick acrylic polymer film B2. Using the acrylic polymer film B2, but otherwise in the same manner as Example 18, was obtained a PSA sheet according to this Example.

Example 20

As the middle layer, was used 150 μm thick thermoplastic polyurethane film A (product name ESMER URS PX98 available from Nihon Matai Co., Ltd.). Otherwise in the same manner as Example 18, was obtained a PSA sheet according to this Example.

Example 21

As the middle layer, was used 50 μm thick polyurethane film B (product name KRANZEAL available from Kurabo Industries, Ltd.). Otherwise in the same manner as Example 18, was obtained a PSA sheet according to this Example.

Example 22

As the middle layer, was used 100 μm thick silicone rubber film (product name KEIJU CF-100-5A available from Mitsubishi Chemical Corporation). Otherwise in the same manner as Example 18, was obtained a PSA sheet according to this Example.

Example 23

As the middle layer, was used 50 μm thick PET film (product name LUMIRROR S10 available from Toray Industries, Inc.). Otherwise in the same manner as Example 14, was obtained a PSA sheet according to this Example.

Example 24

In toluene, was dissolved acrylic block copolymer A (trade name KURARITY LA3320 available from Kuraray Co., Ltd., polyMMA-polyBA-polyMMA triblock copolymer) to 30% concentration. The resulting polymer solution was applied onto the release face of release film R1 (product name MRF #38 available from Mitsubishi Plastics, Inc.: 38 μm thick) and allowed to dry at 130° C. for 3 min to form a 250 μm thick acrylic polymer layer. To the exposed face of the acrylic polymer layer, was adhered release film R2 (product name MRF #38 available from Mitsubishi Plastics, Inc.: 38 μm thick). In this manner, was obtained a PSA sheet according to this Example. In the PSA sheet of this Example, the faces to be adhered to adherends are protected with release films R1 and R2. In Table 2, H-1 represents the emulsion-based PSA used in this Example.

Example 25

In place of acrylic block copolymer A, was used acrylic block copolymer B (trade name KURARITY LA2250 available from Kuraray Co., Ltd., polyMMA-polyBA-polyMMA triblock copolymer). Otherwise in the same manner as Example 24, was formed a 250 μm thick acrylic PSA layer and was obtained a PSA sheet of this Example. In the PSA sheet of this Example, the faces to be adhered to adherends are protected with release films R1 and R2. In Table 2, H-2 represents the emulsion-based PSA used in this Example.

Performance Evaluations

With respect to the resulting PSA sheets, were determined the normal peel strength (N/10 mm), water-peel strength (N/10 mm), stress at 100% elongation (MPa), stress at 500% elongation (MPa), fracture stress σf(MPa) and fracture strain εf (%). The results are shown in Tables 1 and 2.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Monomer composition (%) | BA | 54.9 | 46.5 | 45.6 | 45.0 | 45.0 | 43.5 | 44.1 |
| | CHA | 11.5 | 9.7 | 9.5 | 9.4 | 9.4 | 9.1 | 9.2 |
| | 4HBA | 22.1 | 24.3 | 18.4 | 18.1 | 18.1 | 38.3 | 17.8 |
| | HEA | 7.4 | 12.5 | 6.1 | 24.2 | 24.2 | 5.8 | 5.9 |
| | NVP | 4.1 | 6.9 | 20.4 | 3.4 | 3.4 | 3.2 | 3.3 |
| | BzA | | | | | | | 19.7 |
| | AA-6 | | | | | | | |
| | AS-6 | | | | | | | |
| | EBECRYL 3703 | | | | | | | |
| Crosslinking agent (parts) | HDDA | | 0.1 | 0.1 | 0.1 | | 0.1 | 0.1 |
| | TMPTA | | | | | 0.1 | | |
| | DPHA | 0.15 | | | | | | |
| Surfactant (parts) | | 0.3 | 0.3 | 0.3 | 0.3 | 0.3 | 0.3 | 0.3 |
| Silane coupling agent (parts) | | | | | | | | |
| Normal peel strength (N/10 mm) | | 5.2 | 7.7 | 6.3 | 6.9 | 7.1 | 6.3 | 6.8 |
| Water-peel strength (N/10 mm) | | 0.2 | 0.4 | 0.3 | 1.2 | 0.9 | 0.3 | 0.2 |
| Stress at 100% elongation (MPa) | | 0.11 | 0.17 | 0.35 | 0.21 | 0.19 | 0.14 | 0.15 |
| Stress at 500% elongation (MPa) | | 0.25 | 0.39 | 0.89 | 0.47 | 0.49 | 0.34 | 0.33 |
| Fracture stress σf (MPa) | | 0.39 | 0.54 | 1.54 | 0.56 | 0.65 | 0.45 | 0.43 |
| Fracture strain εf (%) | | 750 | 730 | 1020 | 655 | 690 | 690 | 750 |
| σf × εf | | 293 | 394 | 1571 | 364 | 446 | 311 | 323 |
| Reworkability on rigid body | 1.5 cm × 5 cm | G | G | G | G | G | G | G |
| | 3 cm × 5 cm | P | G | G | G | G | G | G |

TABLE 1-continued

| | | Ex. 8 | Ex. 9 | Ex. 10 | Ex. 11 | Ex. 12 | Ex. 13 |
|---|---|---|---|---|---|---|---|
| Monomer composition (%) | BA | 47.2 | 50.8 | 54.0 | 57.3 | 54.9 | 50.8 |
| | CHA | 9.9 | 10.5 | 11.3 | 12.0 | 11.5 | 10.6 |
| | 4HBA | 19.0 | 20.5 | 21.8 | 23.1 | 22.1 | 20.5 |
| | HEA | 6.3 | 6.8 | 7.3 | 7.7 | 7.4 | 6.8 |
| | NVP | 3.5 | 3.8 | 4.0 | | 4.1 | 3.8 |
| | BzA | | | | | | |
| | AA-6 | 14.1 | 7.6 | | | | |
| | AS-6 | | | 1.6 | | | |
| | EBECRYL 3703 | | | | | | 7.6 |
| Crosslinking agent (parts) | HDDA | 0.1 | 0.1 | 0.1 | | 0.1 | 0.1 |
| | TMPTA | | | | | | |
| | DPHA | | | | 0.12 | | |
| Surfactant (parts) | | 0.3 | 0.3 | 0.3 | | 0.3 | 0.3 |
| Silane coupling agent (parts) | | | | | 0.4 | | |
| Normal peel strength (N/10 mm) | | 2.9 | 4.9 | 5.0 | 5.6 | 5.8 | 1.9 |
| Water-peel strength (N/10 mm) | | 0.1 | 0.1 | 0.1 | 2.7 | 0.1 | 0.1 |
| Stress at 100% elongation (MPa) | | 0.59 | 0.27 | 0.20 | 0.19 | 0.13 | — |
| Stress at 500% elongation (MPa) | | — | 0.81 | 0.44 | — | 0.31 | — |
| Fracture stress σf (MPa) | | 1.61 | 0.82 | 0.52 | 0.39 | 0.37 | 0.27 |
| Fracture strain εf (%) | | 340 | 530 | 650 | 480 | 630 | 83 |
| σf × εf | | 547 | 435 | 335 | 185 | 235 | 22 |
| Reworkability on rigid body | 1.5 cm × 5 cm | G | G | G | P | P | P |
| | 3 cm × 5 cm | G | G | G | P | P | P |

TABLE 2

| | | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|---|---|
| PSA layer thickness (μm) | UV-curable PSA U-1 | 50 | 50 | 100 | 50 | | | | | | 50 | | |
| | Emulsion PSA E-1 | | | | | 25 | 25 | 25 | 25 | 25 | | | |
| | Acrylic PSA H-1 | | | | | | | | | | | 250 | |
| | Acrylic PSA H-2 | | | | | | | | | | | | 250 |
| Middle layer thickness (μm) | Acrylic polymer film A | 50 | 150 | 50 | | 150 | | | | | | | |
| | Acrylic polymer film B | | | | 150 | | 50 | | | | | | |
| | Polyurethane film A | | | | | | | 150 | | | | | |
| | Polyurethane film B | | | | | | | | 50 | | | | |
| | Silicone rubber film | | | | | | | | | 100 | | | |
| | PET film | | | | | | | | | | 50 | | |
| Total thickness (μm) | | 150 | 250 | 250 | 250 | 200 | 100 | 200 | 100 | 150 | 150 | 250 | 250 |
| Normal peel strength (N/10 mm) | | 5.3 | 5.7 | 5.6 | 6.2 | 4.5 | 4.3 | 5.1 | 4.8 | 5.1 | 5.5 | 5,2 | 3.2 |
| Water-peel strength (N/10 mm) | | 0.3 | 0.4 | 0.4 | 0.5 | 0.4 | 0.3 | 0.4 | 0.4 | 0.5 | 0.5 | 4.2 | 2.8 |
| Stress at 100% elongation (MPa) | | 0.31 | 0.28 | 0.25 | 0.40 | 0.18 | 1.6 | 5.6 | 4.7 | 1.5 | 37.5 | 0.19 | 0.6 |
| Stress at 500% elongation (MPa) | | 1.1 | 1.0 | 0.7 | 1.3 | 0.6 | 3.8 | 9.9 | 11.0 | — | — | 0.7 | 1.5 |
| Fracture stress σf (MPa) | | 1.7 | 1.9 | 1.6 | 4.5 | 3.4 | 3.9 | 28.5 | 22.0 | 3.8 | 96.0 | 2.3 | 7.2 |
| Fracture strain εf (%) | | 780 | 770 | 900 | 820 | 1850 | 900 | 1160 | 1570 | 300 | 270 | 1400 | 1050 |
| σf × εf | | 1326 | 1471 | 1467 | 3590 | 6290 | 3510 | 33060 | 34540 | 1140 | 25920 | 3150 | 7530 |
| Reworkability on rigid body 3 cm × 5 cm | | G | G | G | G | G | G | G | G | G | P | P | P |

Examples 1 to 13 shown in Table 1 all used monolayer PSA sheets. Among them, Examples 1 to 10 passed the 1.5 cm×5 cm adhesion test evaluating the reworkability on rigid body. The PSA sheet of each Example (Ex. 1 to 10) above had a water-peel strength of 2 N/10 mm or less, a stress at 100% elongation of less than 30 MPa, and a of εf value (stretch strength property; the multiplication product of fracture stress σf(MPa) and fracture strain εf (%)) of 250 or greater. The PSA sheet of each Example (Ex. 1 to 10) above included a surfactant. Examples 2 to 10 with stretch strength property σf·ε≥300 showed superior reworkability on rigid body. The PSA sheets of Examples 1 to 10 had normal peel strength values of 2.5 N/10 mm or greater. On the other hand, the PSA sheets of Examples 11 to 13 failed the test of reworkability on rigid body. In Example 11, the water-peel strength exceeded 2 N/10 mm, the PSA layer was free of a surfactant, and the stretch strength property (σf·εf) was less than 250. The PSA sheet of Example 12 had a water-peel strength of 2 N/10 mm or less and the PSA layer included a surfactant, but the stretch strength property (σf·εf) was less than 250. The PSA sheet of Example 13 had a water-peel strength of 2 N/10 mm or less and the PSA layer included a surfactant, but did not reach 100% elongation. The stretch strength property (σf·εf) was also less than 250.

More specific examination of the results in Table 1 shows the following: For instance, based on comparison of Examples 4, 6 and 12, with increasing amount of hydroxy group-containing monomer(s) (in particular, HEA, 4HBA), the fracture stress increases without a decrease in fracture strain, or rather while improving the fracture stress. In comparison between Examples 3 and 12, with increasing N-containing monomer (in particular, NVP) usage, both the fracture stress and the fracture strain significantly increase. Example 11 using a different crosslinking agent (polyfunctional monomer) shows that a decrease in amount of N-containing monomer has impact (lowers the fracture strain). In Example 2 with increased amounts of hydroxy group-containing monomer and N-containing monomer, both the fracture stress and the fracture strain improved as compared with Example 12. Based on comparisons between Examples 1 and 12 and between Examples 4 and 5, both the fracture stress and the fracture strain can be improved through a selection of species of crosslinking agent (polyfunctional monomer) and adjustment of the amount of crosslinking agent. Examples 7 to 10 further show that with the use of benzyl acrylate or a macromonomer, the fracture stress and the fracture strain can be improved or adjusted in a balanced manner. It is thought that the monomer structure exhibited cohesion not derogatory to the flexibility of the PSA layer, improving the fracture stress and the fracture strain.

As Examples 1 to 10 all had good normal peel strength with water-peeling properties, in designing a PSA layer, through monomer species such as polar group-containing monomers and crosslinking agent species as well as adjustment of amounts thereof, it is possible to obtain a preferable stress at 100% elongation and improved stretch strength property ($\sigma f \cdot \varepsilon f$) while maintaining prescribed peeling properties.

As shown in Table 2, excellent reworkability on rigid body was also obtained in Examples 14 to 22 using laminate-type PSA sheets having middle layers. These Examples had water-peeling properties with stress at 100% elongation <30 MPa and stretch strength property ($\sigma f \cdot \varepsilon f$)≥250. Examples 14 to 17 show that even when using a PSA (PSA of Example 1) that gives poor results as the PSA layer alone regarding the reworkability on rigid body with 3 cm×5 cm adhesion, the inclusion of a middle layer can improve the stretch strength property ($\sigma f \cdot \varepsilon f$), bringing about excellent reworkability on rigid body. The PSA sheets of Examples 14 to 22 had normal peel strength values of 2.5 N/10 mm or greater. On the other hand, Example 23 having PET film as the middle layer showed a high stretch strength property ($\sigma f \cdot \varepsilon f$) value, but was less stretchable with stress at 100% elongation ≥30 MPa; and therefore, water was not allowed to enter the bonding interface, resulting in lack of reworkability on rigid body. With respect to the monolayer PSA sheets of Examples 24 and 25 using middle layer materials as the PSA layers, due to lack of water-peeling properties, reworkability on rigid body was not obtained.

These results show that according to a PSA sheet having a water-peel strength of 2 N/10 mm or less or having a PSA layer comprising at least one species of compound selected among surfactants and polyoxyalkylene backbone-containing compounds, and further having a stress at 100% elongation of less than 30 MPa and $\sigma f \cdot \varepsilon f$≥250, along with good peeling properties using aqueous liquid such as water, bonding reliability and peeling removability can be combined. In particular, it is evident that according to the PSA sheet in an aforementioned embodiment, stretching by a smaller force can give rise to good water-peeling properties while bringing about good peeling removability without rupture against the pull during peeling.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

1, 2, 3 PSA sheets
10 PSA layer
11 first PSA layer
12 second PSA layer
10A first surface (adhesive face)
10B second surface
20 support (support layer)
20A first face
20B second face (backside)
25 middle layer
30, 31, 32 release liners
50 release-linered PSA sheet

What is claims is:

1. A pressure-sensitive adhesive sheet having a pressure-sensitive adhesive layer, the pressure-sensitive adhesive sheet having a water-peel strength of 2 N/10 mm or less, determined after the adhesive face of the pressure-sensitive adhesive layer is applied to the surface of an alkaline float glass plate adherend having a contact angle of 5° to 10° with distilled water, the resultant is stored at room temperature for one day, 20 μL of distilled water is dropped onto the adherend and the distilled water is allowed to enter an interfacial edge between the adhesive face and the adherend; according to JIS Z0237: 2009 "10.4.1 Method 1: 180° Peel Strength to Test Plate"; specifically, at a test temperature of 23° C. at a tensile speed of 300 mm/min at a peel angle of 180° using a tensile tester; and further having a stress at 100% elongation of less than 30 MPa as well as a multiplication product ($\sigma f \cdot \varepsilon f$) of fracture stress $\sigma f$(MPa) and fracture strain $\varepsilon f$ (%) of 250 or greater, wherein the stress at 100% elongation, the fracture stress $\sigma f$ and the fracture strain $\varepsilon f$ are determined based on a tensile test carried out at a tensile speed of 100 mm/min.

2. The pressure-sensitive adhesive sheet according to claim 1, having a normal peel strength of 2.5 N/10 mm or greater and 15 N/10 mm or less, determined after the adhesive face of the pressure-sensitive adhesive layer is applied to the surface of an alkaline float glass plate adherend having a contact angle of 5° to 10° with distilled water, according to JIS Z0237: 2009 "10.4.1 Method 1:180° Peel Strength to Test Plate," specifically, at a test temperature of 23° C. at a tensile speed of 300 mm/min at a peel angle of 180° using a tensile tester.

3. The pressure-sensitive adhesive sheet according to claim 1, wherein the pressure-sensitive adhesive layer is formed from a water-dispersed pressure-sensitive adhesive composition, a solvent-based pressure-sensitive adhesive composition, an active energy ray-curable pressure-sensitive adhesive composition or a hot-melt pressure-sensitive adhesive composition.

4. The pressure-sensitive adhesive sheet according to claim 1, wherein the pressure-sensitive adhesive layer is an acrylic pressure-sensitive adhesive layer.

5. The pressure-sensitive adhesive sheet according to claim 1, that is formed as an adhesively double-faced pressure-sensitive adhesive sheet, wherein the pressure-sensitive adhesive layer constitutes at least one adhesive face of the pressure-sensitive adhesive sheet.

6. The pressure-sensitive adhesive sheet according to claim 5, having first and second pressure-sensitive adhesive layers, each as the pressure-sensitive adhesive layer; and further having a middle layer placed between the first and second pressure-sensitive adhesive layers.

7. The pressure-sensitive adhesive sheet according to claim 6, wherein the middle layer is formed of a material comprising an acrylic resin, a polyurethane-based resin, a urethane (meth)acrylate-based polymer, a polyolefinic resin, a polyvinyl chloride-based resin, a silicone, a rubber or an elastomer.

* * * * *